US012594828B2

(12) United States Patent
Kieke

(10) Patent No.: US 12,594,828 B2
(45) **Date of Patent: \*Apr. 7, 2026**

(54) ELECTRIC WORK VEHICLE

(71) Applicant: KUBOTA CORPORATION, Osaka (JP)

(72) Inventor: David Kieke, Fremont, CA (US)

(73) Assignee: KUBOTA CORPORATION, Osaka (JP)

( \* ) Notice: Subject to any disclaimer, the term of this patent is extended or adjusted under 35 U.S.C. 154(b) by 0 days.

This patent is subject to a terminal disclaimer.

(21) Appl. No.: 18/532,057

(22) Filed: Dec. 7, 2023

(65) Prior Publication Data

US 2025/0135875 A1 May 1, 2025

Related U.S. Application Data

(60) Provisional application No. 63/546,275, filed on Oct. 30, 2023.

(51) Int. Cl.
B60K 17/04 (2006.01)
B60K 1/02 (2006.01)
(Continued)

(52) U.S. Cl.
CPC .............. B60K 17/043 (2013.01); B60K 1/02 (2013.01); B60K 7/0007 (2013.01); B60K 17/28 (2013.01);
(Continued)

(58) Field of Classification Search
CPC .... B60K 17/043; B60K 7/0007; B60K 17/28; B60K 25/00; B60K 2007/0061;
(Continued)

(56) References Cited

U.S. PATENT DOCUMENTS 1,055,619 A  *  3/1913  Dunn ................... F16H 61/444
60/483
1,428,236 A  *  9/1922  Jones ..................... B60R 25/04
70/226
(Continued)

FOREIGN PATENT DOCUMENTS

DE        102021116297 A1    12/2022

OTHER PUBLICATIONS

Kieke, "Electric Work Vehicle", U.S. Appl. No. 18/532,041, filed Dec. 7, 2023.
(Continued)

*Primary Examiner* — Timothy Wilhelm
(74) *Attorney, Agent, or Firm* — Keating & Bennett, LLP

(57) ABSTRACT

An electric work vehicle includes a rear housing, a first motor to drive a first rear wheel, the first motor being supported by the rear housing, a second motor to drive a second rear wheel, the second motor being supported by the rear housing, and a locking assembly. The first motor is connected to a first gearing to drive the first rear wheel. The second motor is connected to a second gearing to drive the second rear wheel. The first gearing and the second gearing are operable to rotate independently of each other. The locking assembly is operable to simultaneously lock both of the first gearing and the second gearing from being able to rotate.

19 Claims, 46 Drawing Sheets

(51) Int. Cl.
| | |
|---|---|
| *B60K 7/00* | (2006.01) |
| *B60K 17/28* | (2006.01) |
| *B60K 25/00* | (2006.01) |
| *B60L 1/00* | (2006.01) |
| *F16H 57/02* | (2012.01) |
| *F16H 63/34* | (2006.01) |

(52) U.S. Cl.
CPC .............. *B60K 25/00* (2013.01); *B60L 1/00*
(2013.01); *B60L 1/003* (2013.01); *F16H 57/02*
(2013.01); *F16H 63/3416* (2013.01); *B60K*
*2007/0061* (2013.01); *F16H 2057/02034*
(2013.01); *F16H 2057/02052* (2013.01); *F16H*
*2057/02056* (2013.01)

(58) Field of Classification Search
CPC . B60L 1/00; B60L 1/003; F16H 57/02; F16H
63/3416; F16H 2057/02034; F16H
2057/02052; F16H 2057/02056
See application file for complete search history.

(56) References Cited

U.S. PATENT DOCUMENTS

| | | | | |
|---|---|---|---|---|
| 1,609,833 | A * | 12/1926 | Robson | F16H 39/14 |
| | | | | 105/62.1 |
| 2,031,399 | A * | 2/1936 | White | B60K 25/06 |
| | | | | 56/6 |
| 4,034,824 | A * | 7/1977 | Lucas | B60R 25/09 |
| | | | | 188/69 |
| 4,233,858 | A * | 11/1980 | Rowlett | B60K 6/30 |
| | | | | 290/22 |
| 4,359,909 | A * | 11/1982 | Sogo | F16N 7/16 |
| | | | | 184/6.12 |
| 4,622,833 | A * | 11/1986 | Shepherd | B60R 25/09 |
| | | | | 70/226 |
| 4,845,949 | A * | 7/1989 | Shivvers | F16H 61/4157 |
| | | | | 60/489 |
| 5,046,306 | A * | 9/1991 | Borre, Jr. | F16N 7/32 |
| | | | | 60/39.08 |
| 5,065,848 | A * | 11/1991 | Barrett | B60R 25/08 |
| | | | | 188/31 |
| 5,113,977 | A * | 5/1992 | Ridings | B62B 5/04 |
| | | | | 280/47.27 |
| RE34,833 | E * | 1/1995 | Hasegawa | B60K 17/28 |
| | | | | 475/83 |
| 5,406,778 | A * | 4/1995 | Lamb | A01D 34/44 |
| | | | | 56/11.9 |
| 5,419,406 | A * | 5/1995 | Kawamoto | B60K 1/02 |
| | | | | 475/5 |
| 5,557,977 | A * | 9/1996 | Stockton | F16H 47/085 |
| | | | | 475/47 |
| 5,564,518 | A * | 10/1996 | Ishii | B60K 17/344 |
| | | | | 74/665 F |
| 5,644,954 | A * | 7/1997 | Matsufuji | F16H 57/0421 |
| | | | | 74/606 R |
| 5,873,224 | A * | 2/1999 | Murakawa | A01D 34/64 |
| | | | | 56/11.4 |
| 6,048,288 | A * | 4/2000 | Tsujii | B60W 10/30 |
| | | | | 903/910 |
| 6,053,833 | A * | 4/2000 | Masaki | B62M 6/55 |
| | | | | 903/910 |
| 6,109,009 | A * | 8/2000 | Benson | B60L 58/21 |
| | | | | 56/10.2 G |
| 6,170,615 | B1 * | 1/2001 | Cheng | B62B 9/082 |
| | | | | 280/47.38 |
| 6,179,092 | B1 * | 1/2001 | Naaktgeboren | A01B 73/00 |
| | | | | 188/69 |
| 6,860,358 | B1 * | 3/2005 | Hauser | B60K 17/105 |
| | | | | 180/305 |
| 6,959,971 | B2 * | 11/2005 | Tsunehara | B60K 6/52 |
| | | | | 303/3 |

| | | | | |
|---|---|---|---|---|
| 6,964,631 | B2 * | 11/2005 | Moses | F16H 61/0031 |
| | | | | 180/65.265 |
| 7,172,040 | B2 * | 2/2007 | Oshima | A01D 69/12 |
| | | | | 74/606 R |
| 7,179,188 | B2 * | 2/2007 | Ishii | B60K 17/043 |
| | | | | 475/74 |
| 7,225,617 | B1 * | 6/2007 | Langenfeld | F16H 61/40 |
| | | | | 60/484 |
| 7,229,256 | B1 * | 6/2007 | Hauser | F04B 1/22 |
| | | | | 417/269 |
| 7,370,714 | B2 * | 5/2008 | Yasuda | B60K 7/0015 |
| | | | | 74/606 R |
| 7,391,129 | B2 * | 6/2008 | Chiao | B60L 50/16 |
| | | | | 307/9.1 |
| 7,421,917 | B2 * | 9/2008 | Nishino | B60K 17/105 |
| | | | | 74/15.82 |
| 7,578,116 | B1 * | 8/2009 | Howell | B60K 1/04 |
| | | | | 56/11.9 |
| 7,662,062 | B2 * | 2/2010 | Yang | B60W 10/06 |
| | | | | 477/5 |
| 7,690,470 | B2 * | 4/2010 | Iwaki | B62D 9/002 |
| | | | | 180/254 |
| 7,713,157 | B2 * | 5/2010 | Hastings | H02K 7/116 |
| | | | | 475/5 |
| 7,726,275 | B2 * | 6/2010 | Deniston | F02B 67/06 |
| | | | | 123/198 C |
| 8,012,057 | B2 * | 9/2011 | Meixner | B60K 17/16 |
| | | | | 475/221 |
| 8,037,957 | B2 * | 10/2011 | Laurent | B60K 17/043 |
| | | | | 180/65.6 |
| 8,055,399 | B2 * | 11/2011 | Wyatt | B60L 15/00 |
| | | | | 701/50 |
| 8,092,326 | B2 * | 1/2012 | Amanuma | F16H 55/36 |
| | | | | 474/84 |
| 8,221,284 | B2 * | 7/2012 | Asao | H02K 7/108 |
| | | | | 180/53.8 |
| 8,322,482 | B2 * | 12/2012 | Sprinkle | B60D 1/62 |
| | | | | 180/336 |
| 8,448,541 | B2 * | 5/2013 | Kasuya | B60L 50/16 |
| | | | | 180/65.245 |
| 8,511,216 | B2 * | 8/2013 | Sasahara | F04B 1/20 |
| | | | | 91/506 |
| 8,616,310 | B2 * | 12/2013 | Lopez | B62D 49/00 |
| | | | | 180/53.3 |
| 8,649,925 | B2 * | 2/2014 | Light | G16Z 99/00 |
| | | | | 180/65.21 |
| 8,653,704 | B2 * | 2/2014 | Atarashi | H02K 9/19 |
| | | | | 310/58 |
| 8,668,036 | B2 * | 3/2014 | Wyatt | B60W 10/184 |
| | | | | 180/65.8 |
| 8,678,784 | B2 * | 3/2014 | Atarashi | B60K 6/26 |
| | | | | 417/372 |
| 8,689,759 | B2 * | 4/2014 | Schultz | F02N 11/003 |
| | | | | 123/179.31 |
| 8,701,806 | B2 * | 4/2014 | Ishii | B60K 7/0007 |
| | | | | 180/65.6 |
| 8,727,053 | B2 * | 5/2014 | Yamamoto | B60L 15/2036 |
| | | | | 477/6 |
| 8,808,124 | B2 * | 8/2014 | Major | B60K 25/00 |
| | | | | 180/65.265 |
| 8,818,588 | B2 * | 8/2014 | Ambrosio | B60L 7/14 |
| | | | | 180/65.21 |
| 8,840,511 | B2 * | 9/2014 | Seno | F16H 57/0423 |
| | | | | 184/6.12 |
| 8,888,637 | B2 * | 11/2014 | Kimes | B60L 15/2054 |
| | | | | 475/5 |
| 8,905,885 | B2 * | 12/2014 | Yamamoto | B60K 6/26 |
| | | | | 184/6.12 |
| 8,939,240 | B2 * | 1/2015 | Wehrwein | B60W 10/30 |
| | | | | 180/53.8 |
| 8,961,360 | B2 * | 2/2015 | Ooiso | B60L 3/0023 |
| | | | | 475/331 |
| 8,972,139 | B2 * | 3/2015 | Shinohara | B60W 30/18109 |
| | | | | 701/22 |
| 9,022,174 | B2 * | 5/2015 | Takagi | F16H 57/0476 |
| | | | | 184/6.12 |

(56) References Cited

U.S. PATENT DOCUMENTS

| | | | |
|---|---|---|---|
| 9,033,074 B1* | 5/2015 | Gates | F16D 11/10 |
| | | | 180/53.6 |
| 9,045,115 B2* | 6/2015 | Kaneko | B60T 1/062 |
| 9,145,054 B1* | 9/2015 | Xykis | F16H 7/06 |
| 9,150,090 B2* | 10/2015 | Hiyoshi | B60K 17/046 |
| 9,156,348 B1* | 10/2015 | Swales | B60K 1/00 |
| 9,163,724 B1* | 10/2015 | Langenfeld | B60T 10/04 |
| 9,210,839 B2* | 12/2015 | Schygge | B60L 50/60 |
| 9,263,975 B2* | 2/2016 | Wang | A01D 34/78 |
| 9,266,423 B2* | 2/2016 | Hoshinoya | B60K 6/48 |
| 9,301,443 B2* | 4/2016 | Hashima | B60W 30/18 |
| 9,371,842 B1* | 6/2016 | Langenfeld | F16H 61/4157 |
| 9,487,086 B2* | 11/2016 | Collett | B60K 25/06 |
| 9,499,199 B1* | 11/2016 | Laymon | B62D 11/003 |
| 9,500,197 B2* | 11/2016 | Schultz | F16H 57/0439 |
| 9,549,504 B2* | 1/2017 | Iida | A01D 69/03 |
| 9,638,076 B2* | 5/2017 | Nitta | F16H 57/0439 |
| 9,671,016 B2* | 6/2017 | Nakayama | F16H 48/27 |
| 9,677,246 B2* | 6/2017 | Yoshizawa | B60K 6/54 |
| 9,726,057 B2* | 8/2017 | Yamauchi | H02K 7/116 |
| 9,745,720 B2* | 8/2017 | Naito | B60K 6/365 |
| 9,745,722 B2* | 8/2017 | Monden | B60L 7/26 |
| 9,751,411 B2* | 9/2017 | Benjey | B60L 53/53 |
| 9,765,870 B1* | 9/2017 | Fox | F04B 1/26 |
| 9,783,203 B2* | 10/2017 | Koike | H02P 23/14 |
| 9,809,186 B2* | 11/2017 | Hoshinoya | B60K 7/0007 |
| 9,845,856 B2* | 12/2017 | Gutteridge | B60K 17/28 |
| 9,869,389 B2* | 1/2018 | Rhoades | F16H 63/3433 |
| 9,872,438 B2* | 1/2018 | Eavenson, Sr. | B60W 10/06 |
| 9,878,616 B2* | 1/2018 | Dalum | B60K 25/00 |
| 9,878,748 B2* | 1/2018 | Hellholm | B62D 55/084 |
| 9,919,578 B2* | 3/2018 | Yan | F16H 7/02 |
| 9,933,066 B2* | 4/2018 | Sada | F16H 57/04 |
| 9,937,782 B2* | 4/2018 | Boskovitch | B60L 15/2009 |
| 10,099,552 B2* | 10/2018 | Long | F16H 57/082 |
| 10,106,027 B1* | 10/2018 | Keller | B60K 1/02 |
| 10,202,032 B2* | 2/2019 | Faget | F02N 15/02 |
| 10,207,576 B2* | 2/2019 | Makino | B60K 17/046 |
| 10,239,534 B2* | 3/2019 | Amigo | B60L 50/16 |
| 10,358,040 B1* | 7/2019 | Keller | B60K 11/02 |
| 10,427,520 B2* | 10/2019 | Dalum | B60K 25/06 |
| 10,458,533 B2* | 10/2019 | Ono | F16H 57/0476 |
| 10,539,224 B2* | 1/2020 | Hori | F16H 57/0456 |
| 10,563,761 B2* | 2/2020 | Daiyakuji | F16H 47/02 |
| 10,690,234 B1* | 6/2020 | Oury, Jr. | B60K 11/02 |
| 10,738,878 B2* | 8/2020 | Kiyokami | F16H 57/0441 |
| 10,744,862 B2* | 8/2020 | Sekiguchi | B60K 25/00 |
| 10,781,891 B2* | 9/2020 | Kimes | B60T 1/005 |
| 10,781,910 B2* | 9/2020 | Dalum | F16N 29/00 |
| 10,781,920 B2* | 9/2020 | Kimes | F16D 27/118 |
| 10,792,993 B2* | 10/2020 | Dalum | B60K 6/42 |
| 10,920,871 B2* | 2/2021 | Kita | F16H 57/0483 |
| 10,920,884 B2* | 2/2021 | Tamura | F16H 63/34 |
| 10,948,070 B2* | 3/2021 | Kuhl | F16H 57/0476 |
| 10,974,724 B1* | 4/2021 | Shively | B60K 6/24 |
| 10,989,297 B2* | 4/2021 | Guarino | F16H 57/0471 |
| 10,998,796 B2* | 5/2021 | Ikemoto | H02K 5/203 |
| 11,054,018 B2* | 7/2021 | Hori | F16H 57/0434 |
| 11,084,369 B2* | 8/2021 | Watt | B60K 6/405 |
| 11,145,144 B2* | 10/2021 | Manji | G07C 5/04 |
| 11,192,444 B2* | 12/2021 | Hashimoto | B60W 10/30 |
| 11,287,026 B2* | 3/2022 | Umeki | B60K 6/445 |
| 11,300,036 B2* | 4/2022 | Goto | F01P 7/048 |
| 11,300,203 B2* | 4/2022 | Kwon | F16H 63/304 |
| 11,353,103 B2* | 6/2022 | Kawanishi | H02K 7/116 |
| 11,415,028 B2* | 8/2022 | Hori | B60W 10/04 |
| 11,541,749 B2* | 1/2023 | Nishizawa | B60K 17/24 |
| 11,578,798 B2* | 2/2023 | Nakata | F16H 57/0483 |
| 11,584,242 B2* | 2/2023 | Dalum | B60L 58/22 |
| 11,603,909 B2* | 3/2023 | Lee | F16H 3/728 |
| 11,660,959 B2* | 5/2023 | Viitasalo | B60K 17/28 |
| | | | 180/53.1 |
| 11,701,959 B2* | 7/2023 | Steinberger | B60K 6/365 |
| | | | 475/5 |
| 11,746,876 B2* | 9/2023 | Lundbäck | F16H 55/17 |
| | | | 74/421 R |
| 11,754,169 B1* | 9/2023 | Guarino | F16H 57/0424 |
| | | | 74/467 |
| 11,884,148 B2* | 1/2024 | Nelson | B60K 5/00 |
| 11,927,228 B2* | 3/2024 | Avigur | F16D 63/006 |
| 2003/0188909 A1* | 10/2003 | Ohashi | B60K 25/00 |
| | | | 180/300 |
| 2004/0220011 A1* | 11/2004 | Gumpoltsberger | F16H 48/36 |
| | | | 475/205 |
| 2006/0059879 A1* | 3/2006 | Edmond | A01D 34/78 |
| | | | 56/6 |
| 2006/0076193 A1* | 4/2006 | Ruther | F16H 57/0456 |
| | | | 184/6.12 |
| 2006/0260303 A1* | 11/2006 | Ishii | B60K 17/10 |
| | | | 60/487 |
| 2008/0152517 A1* | 6/2008 | Ishii | B60K 17/10 |
| | | | 417/423.5 |
| 2009/0018716 A1* | 1/2009 | Ambrosio | B60L 7/14 |
| | | | 903/906 |
| 2009/0176619 A1* | 7/2009 | Inoue | B60T 1/005 |
| | | | 477/96 |
| 2009/0255741 A1* | 10/2009 | Major | B60K 6/48 |
| | | | 474/84 |
| 2011/0190083 A1* | 8/2011 | Harrison, III | F16H 7/02 |
| | | | 474/101 |
| 2012/0277944 A1* | 11/2012 | Kaneko | B60L 50/10 |
| | | | 903/930 |
| 2013/0157808 A1* | 6/2013 | Treichel | B60K 6/46 |
| | | | 475/5 |
| 2014/0155214 A1* | 6/2014 | Kimura | F16H 57/045 |
| | | | 475/160 |
| 2014/0158467 A1* | 6/2014 | Kimura | F01M 5/002 |
| | | | 184/6 |
| 2016/0129786 A1* | 5/2016 | Petersen | B60K 17/28 |
| | | | 192/85.01 |
| 2016/0145833 A1* | 5/2016 | Abdel-Baqi | E02F 9/2217 |
| | | | 180/53.4 |
| 2016/0207519 A1* | 7/2016 | Hata | B60W 10/30 |
| 2017/0009771 A1* | 1/2017 | Reul | F04D 29/22 |
| 2018/0106357 A1* | 4/2018 | Kawakami | F16H 57/0423 |
| 2018/0106359 A1* | 4/2018 | Kawakami | F16H 57/0423 |
| 2018/0274660 A1* | 9/2018 | Kita | F16H 57/0445 |
| 2018/0328487 A1* | 11/2018 | Nishimoto | F16H 63/3466 |
| 2018/0334025 A1* | 11/2018 | Hashimoto | B60K 1/02 |
| 2022/0234434 A1* | 7/2022 | Tottori | B60K 1/04 |
| 2022/0304215 A1* | 9/2022 | Shirafuji | G05D 1/0278 |
| 2022/0377959 A1* | 12/2022 | Nakayama | B60L 50/60 |
| 2023/0068720 A1* | 3/2023 | Ima | B62D 11/04 |
| 2023/0271506 A1* | 8/2023 | Wright | F16H 37/0806 |
| | | | 475/5 |
| 2024/0017602 A1* | 1/2024 | Remboski | B60K 17/08 |
| 2024/0217349 A1* | 7/2024 | Ito | B60L 58/15 |
| 2024/0229930 A1* | 7/2024 | Zelger | F16H 63/304 |
| 2024/0391314 A1* | 11/2024 | Okuda | F16H 57/0006 |
| 2024/0418261 A1* | 12/2024 | Zelger | F16H 63/3425 |

OTHER PUBLICATIONS

Kieke, "Electric Work Vehicle", U.S. Appl. No. 18/532,046, filed Dec. 7, 2023.

Kieke, "Electric Work Vehicle", U.S. Appl. No. 18/532,052, filed Dec. 7, 2023.

Kieke, "Electric Work Vehicle", U.S. Appl. No. 18/532,059, filed Dec. 7, 2023.

Kieke, "Electric Work Vehicle", U.S. Appl. No. 18/532,063, filed Dec. 7, 2023.

Kieke, "Electric Work Vehicle", U.S. Appl. No. 18/532,068, filed Dec. 7, 2023.

Kieke, "Electric Work Vehicle", U.S. Appl. No. 18/532,075, filed Dec. 7, 2023.

Kieke, "Electric Work Vehicle", U.S. Appl. No. 18/532,089, filed Dec. 7, 2023.

Kieke, "Electric Work Vehicle", U.S. Appl. No. 18/532,093, filed Dec. 7, 2023.

(56)            References Cited

OTHER PUBLICATIONS

Kieke, "Electric Work Vehicle", U.S. Appl. No. 18/532,100, filed Dec. 7, 2023.
Kieke, "Electric Work Vehicle", U.S. Appl. No. 18/532,108, filed Dec. 7, 2023.
Kieke, "Electric Work Vehicle", U.S. Appl. No. 18/532,116, filed Dec. 7, 2023.
Official Communication issued in corresponding European Patent Application No. 24209185.8, mailed on Apr. 11, 2025, 12 pages.

* cited by examiner

1

4R

2L

2R

REAR     LEFT

RIGHT     FRONT

1

4R

2L

4L

1

2R

2L

UP

RIGHT ← → LEFT

DOWN

REAR ←——→ FRONT

FRONT ◄────► REAR

FRONT

RIGHT

LEFT

REAR

FRONT ◄─────► REAR

REAR ◄─────► FRONT

FRONT ◄──► REAR

FIG. 5D

REAR ◄──► FRONT

FRONT

LEFT ← → RIGHT

REAR

2300

542R

5422R

542L

5420R

5362

5362

5422L

5420R

5420L

18

20

5440L

5444R

5442R

5440R

544R

5444L

5442L

5462R

544L

24

5460R

5462L

546R 5460L 546L

4R3

4L3

FRONT

LEFT RIGHT

REAR

4L3

18

544L   546L

518

24

22

516

2300

510

514    519

542R

4R3

546R 544R   20

5120

512

18

20

Axis of 18

Axis of 20

Axis of 22

2302

Axis of 24

24

UP

LEFT ← → RIGHT

DOWN

18

20

Axes of 18 and 20

Axis of 22

22

2302

Axis of 24

24

UP

LEFT ← → RIGHT

DOWN

551

12-2

12

12-1

12-3

12-35

12-37

12-4

RIGHT ⟷ LEFT

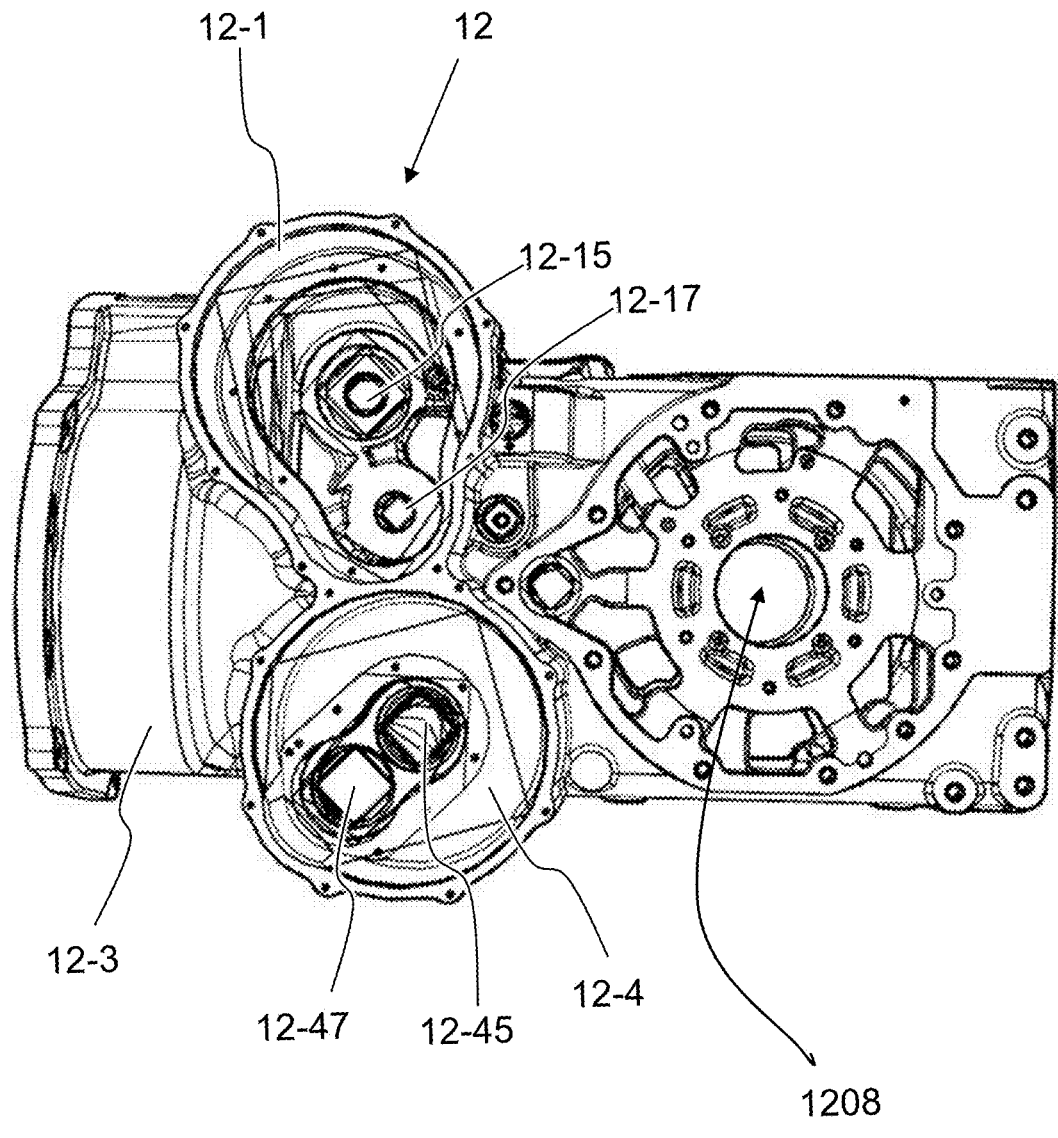
FIG. 18
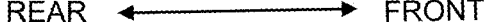
REAR ←——→ FRONT 12-1

12

12-3

12-4

1208

RIGHT

FRONT ← → REAR

LEFT 12-1          12          12-37          12-2

12-3

12-4          1210

LEFT ⟷ RIGHT

FRONT ←————————→ REAR

554

552

12

551

1202

1210

553      404      402      561

RIGHT

FRONT ← → REAR

LEFT

FRONT ◄────────► REAR

RIGHT ◄──────► LEFT

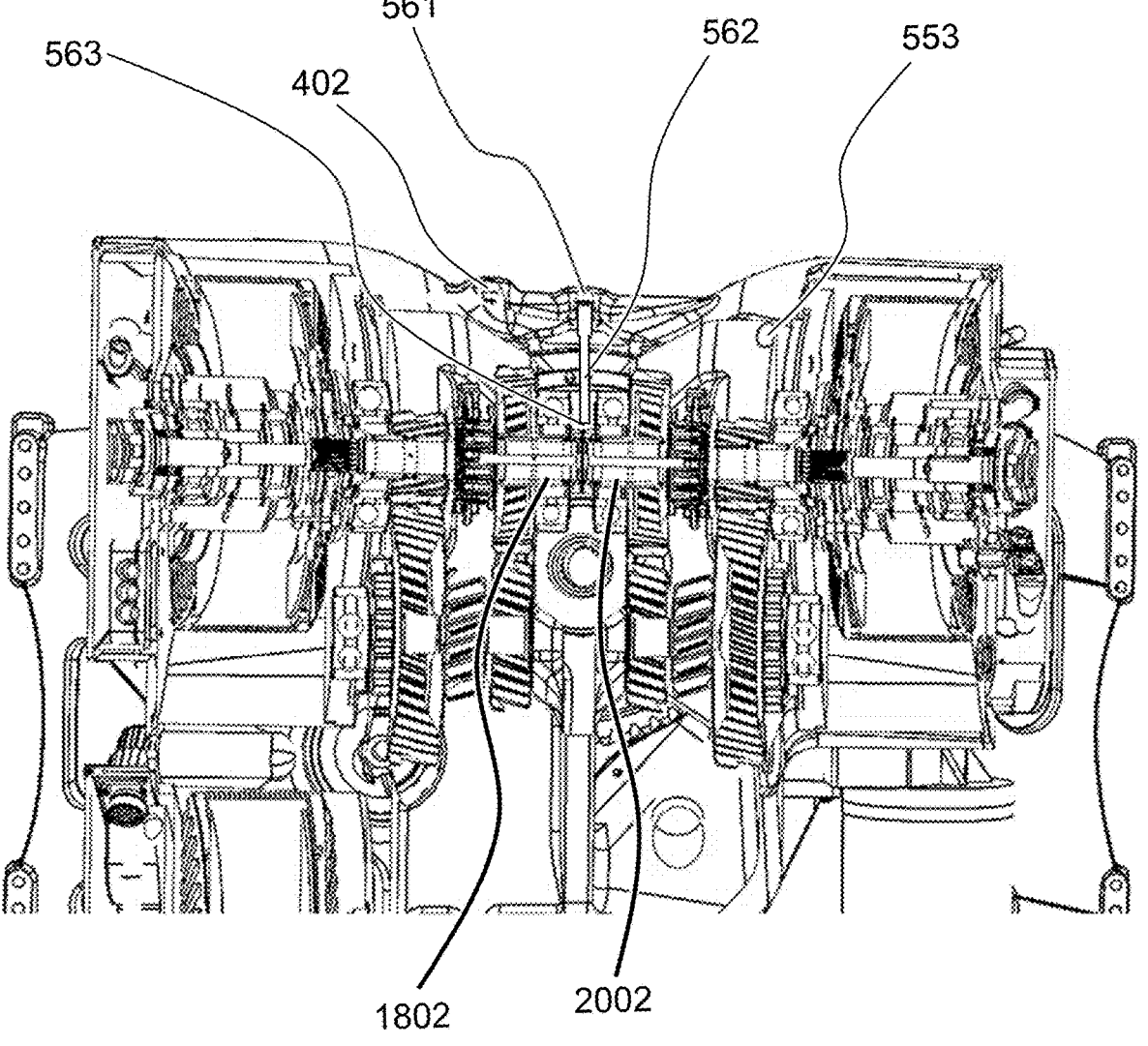
FIG. 31          LEFT ←——→ RIGHT

ELECTRIC WORK VEHICLE

BACKGROUND OF THE INVENTION

1. Field of the Invention

The present invention is directed to an electric work vehicle (EV) such as an electric tractor.

2. Description of the Related Art

Electric work vehicles (EVs) are becoming more prevalent as the industry moves from internal combustion engines towards fully electrically powered motors running on battery systems.

SUMMARY OF THE INVENTION

Preferred embodiments of the present invention provide an electric work vehicle such as an EV tractor.

Preferred embodiments of the present invention provide an electric work vehicle.

A preferred embodiment of an electric work vehicle of the present invention includes a rear housing, a first motor to drive a first rear wheel, the first motor being supported by the rear housing, a second motor to drive a second rear wheel, the second motor being supported by the rear housing, and a locking assembly. The first motor is connected to a first gearing to drive the first rear wheel. The second motor is connected to a second gearing to drive the second rear wheel. The first gearing and the second gearing are operable to rotate independently of each other. The locking assembly is operable to simultaneously lock both of the first gearing and the second gearing from being able to rotate.

According to preferred embodiments of the present disclosure, it is possible to provide an electric work vehicle.

The above and other features, elements, steps, configurations, characteristics, and advantages of the present invention will become more apparent from the following detailed description of preferred embodiments of the present invention with reference to the attached drawings.

BRIEF DESCRIPTION OF THE DRAWINGS

FIG. 5D shows a right side view of an intermediate frame, a battery housing, a front frame, and a rear frame of an electric work vehicle according to a preferred embodiment of the present invention.

FIG. 18 shows a left view of a rear frame according to a preferred embodiment of the present invention.

FIG. 31 shows a cross sectional rear view of a portion of components in a rear frame of an electric work vehicle according to a preferred embodiment of the present invention.

DETAILED DESCRIPTION OF PREFERRED
EMBODIMENTS

Electric work vehicles according to preferred embodiments of the present invention may be a tractor or other agricultural vehicle, but any desirable type of electric work vehicle is applicable to and usable with preferred embodiments of the present invention.

Figure 1A:
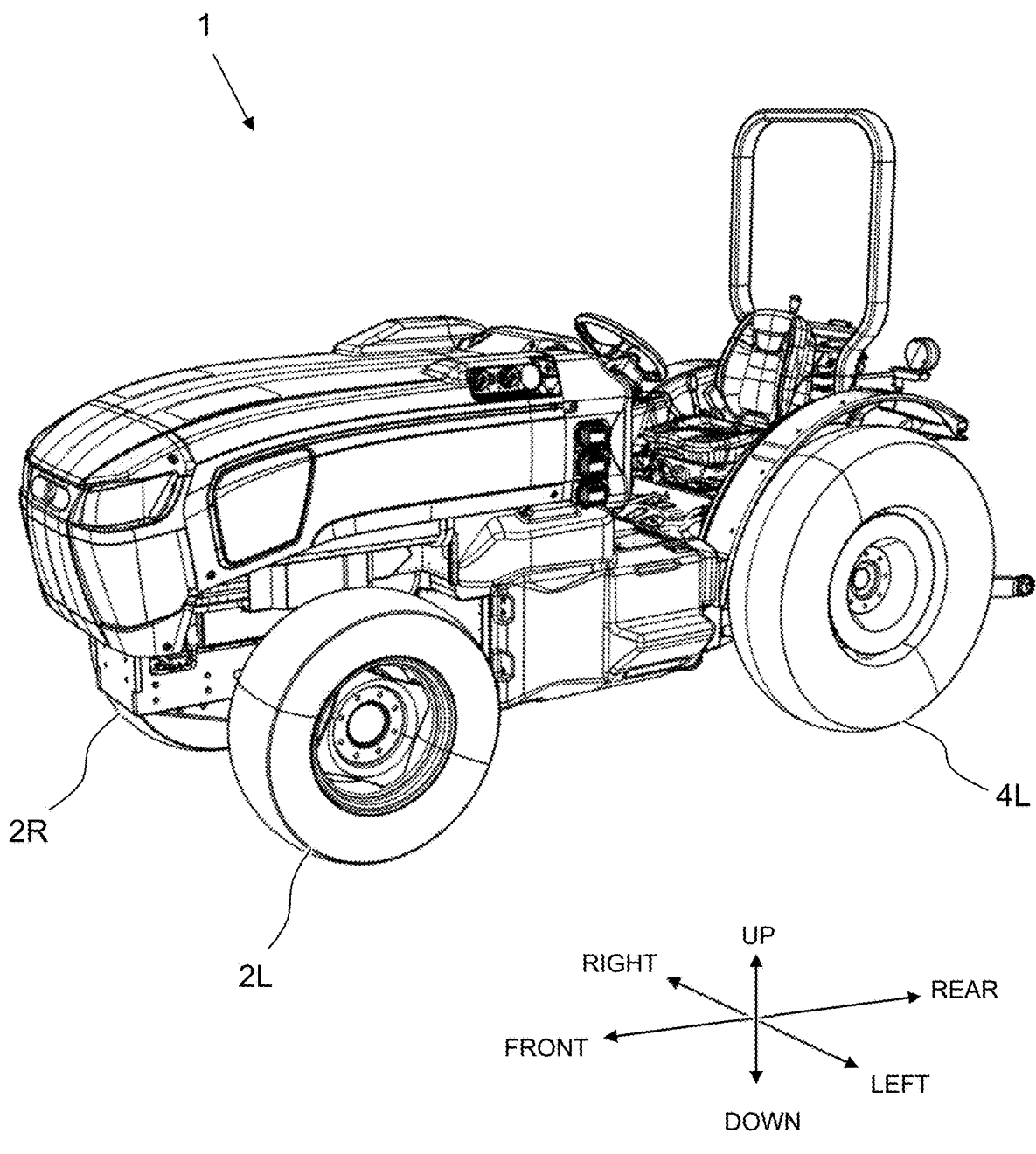
FIG. 1A shows a perspective left-front view of an electric work vehicle according to a preferred embodiment of the present invention.
Figure 1B:
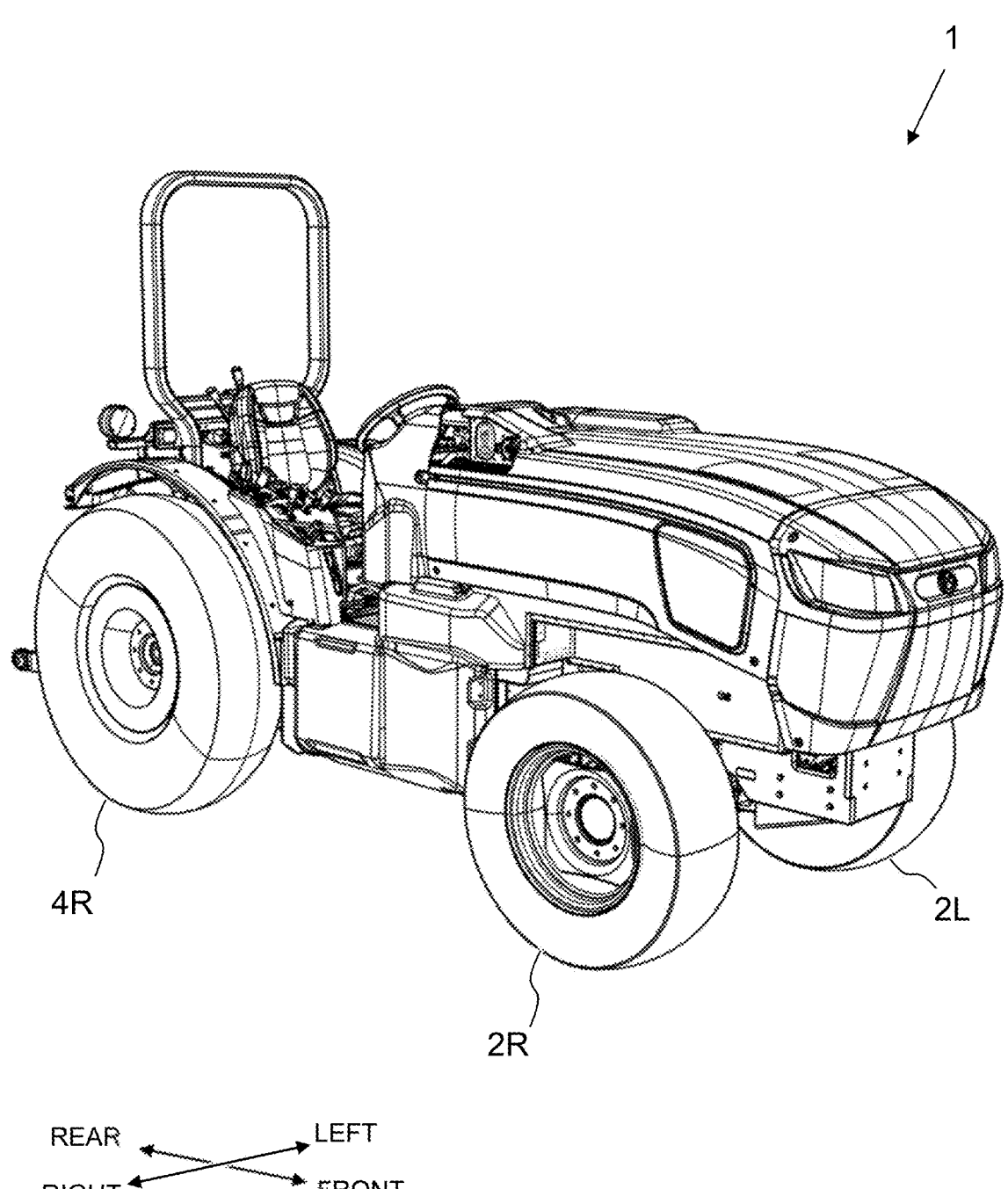
FIG. 1B shows a perspective right-front view of an electric work vehicle according to a preferred embodiment of the present invention.
Figure 1C:
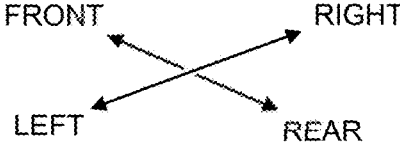
FIG. 1C shows a perspective left-rear view of an electric work vehicle according to a preferred embodiment of the present invention.
Figure 1D:
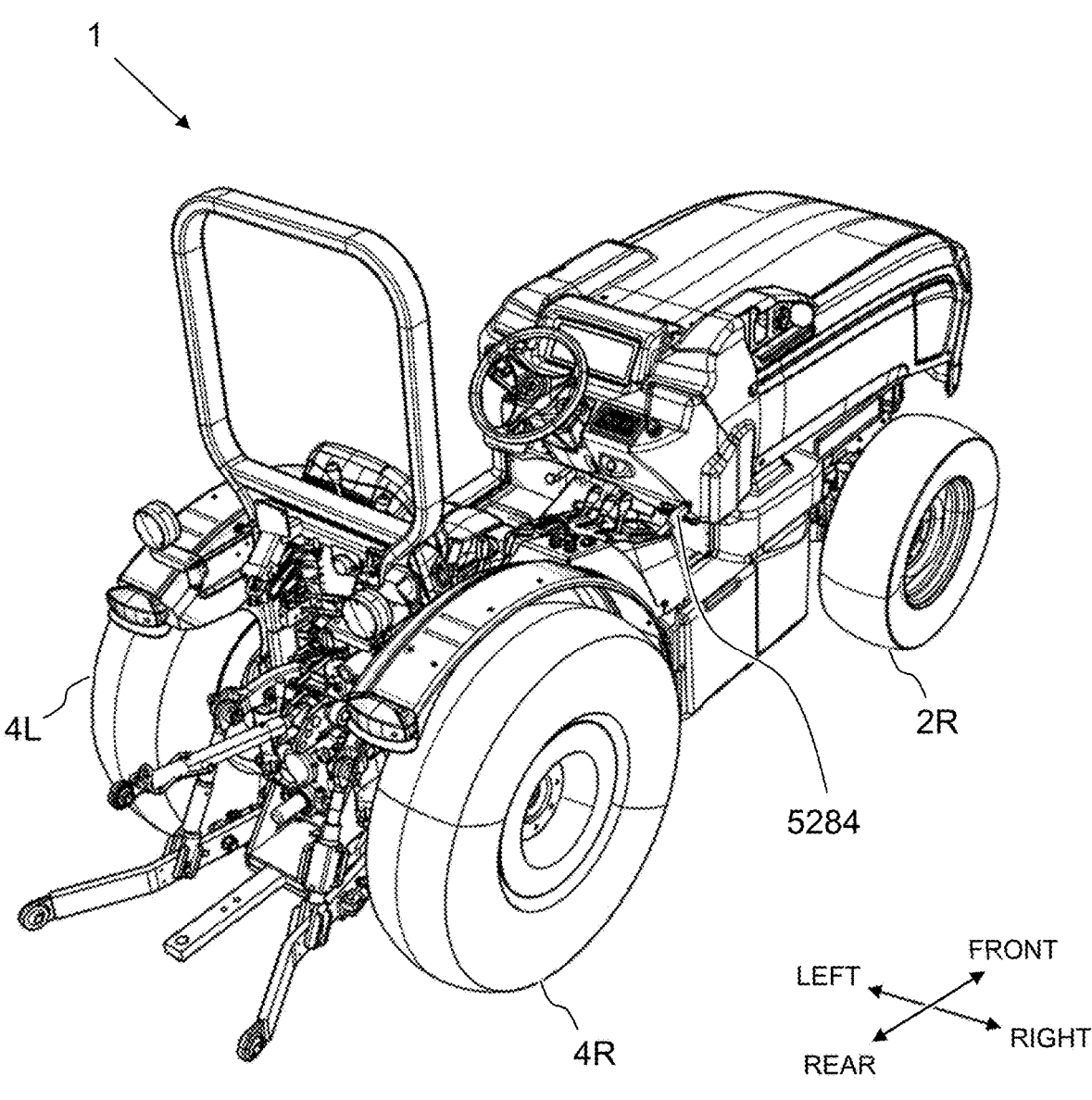
FIG. 1D shows a perspective right-rear view of an electric work vehicle according to a preferred embodiment of the present invention.
Figure 1E:
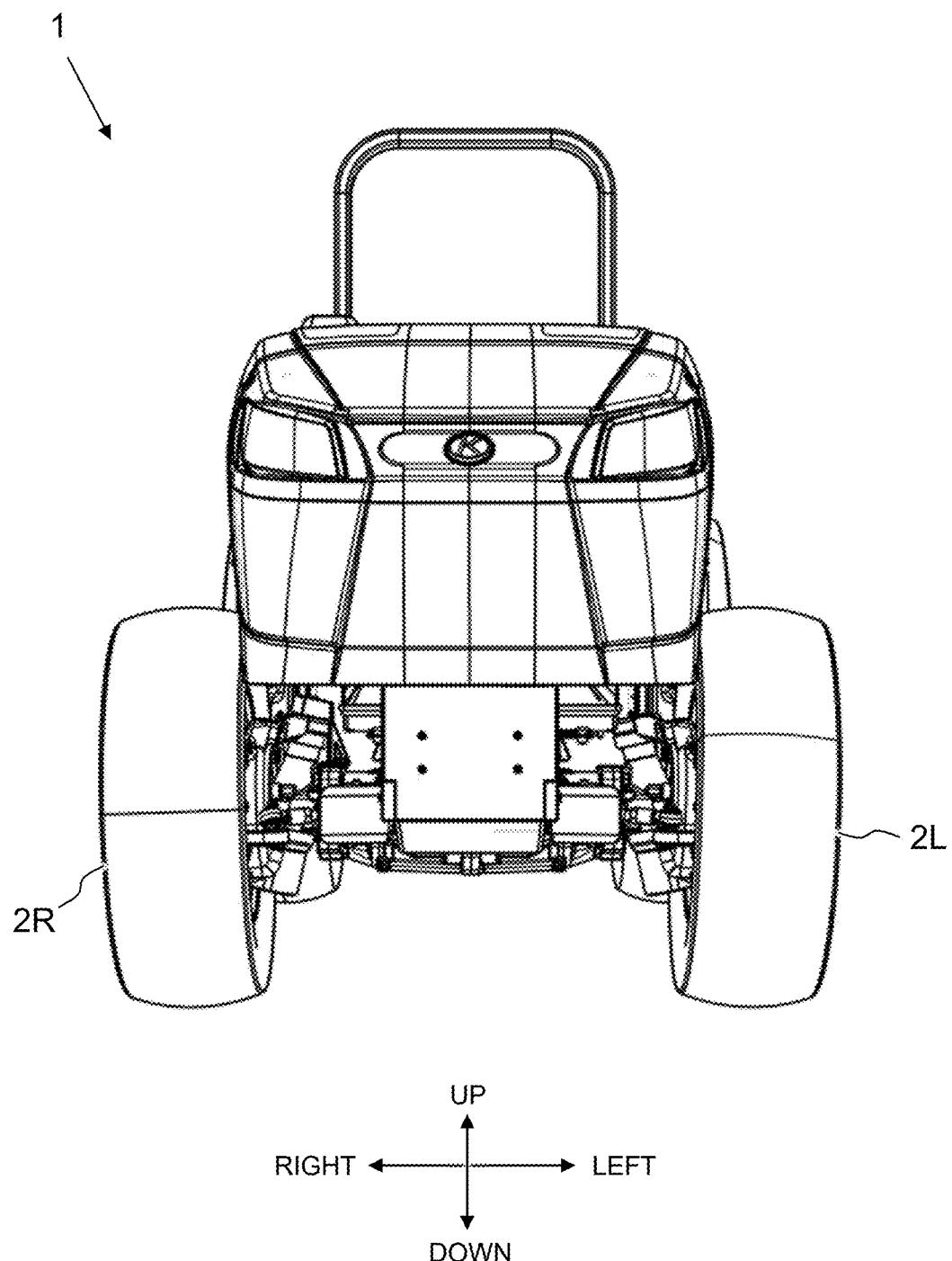
FIG. 1E shows a front view of an electric work vehicle according to a preferred embodiment of the present invention.
Figure 1F:
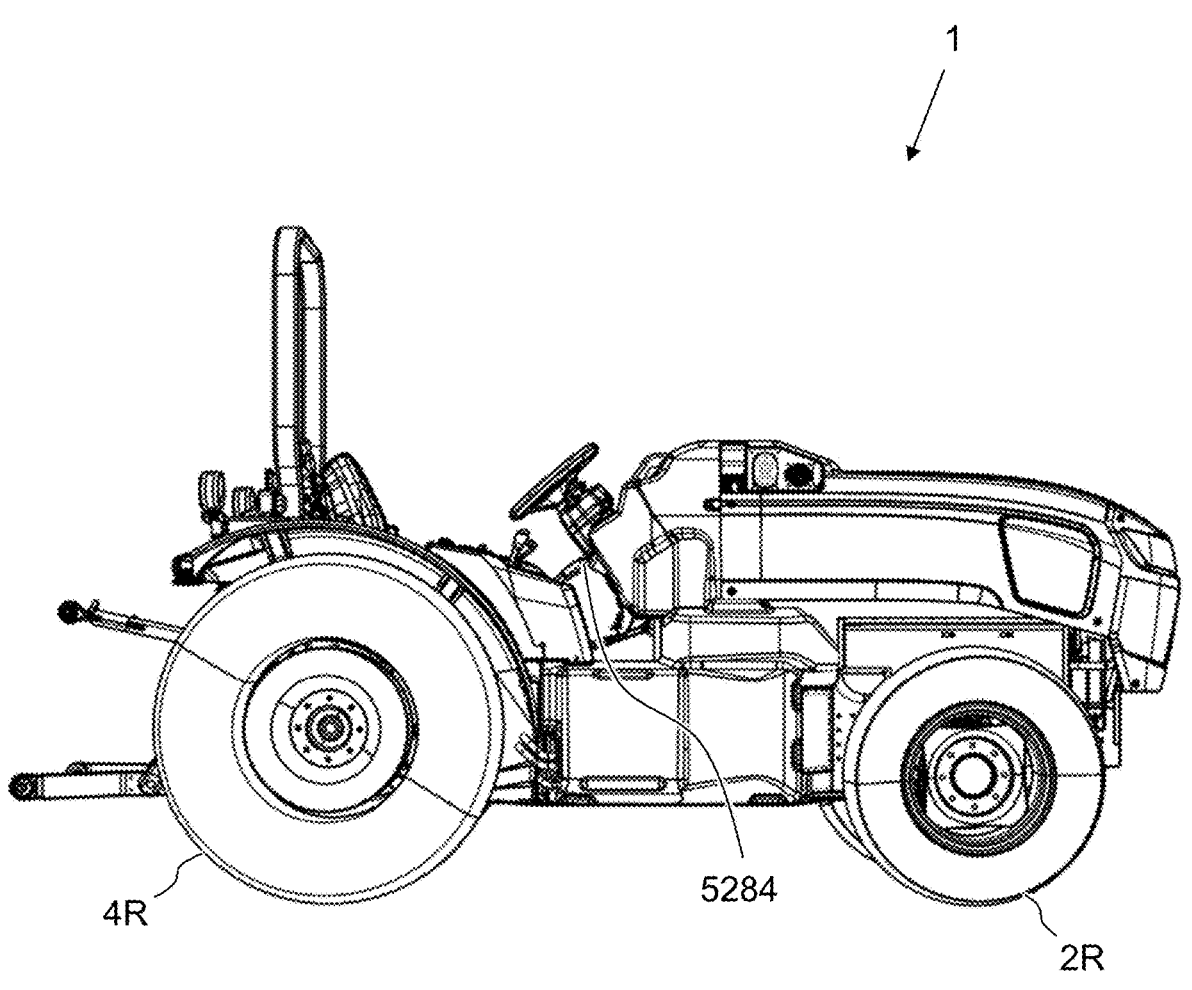
FIG. 1F shows a right side view of an electric work vehicle according to a preferred embodiment of the present invention.
Figure 1G:
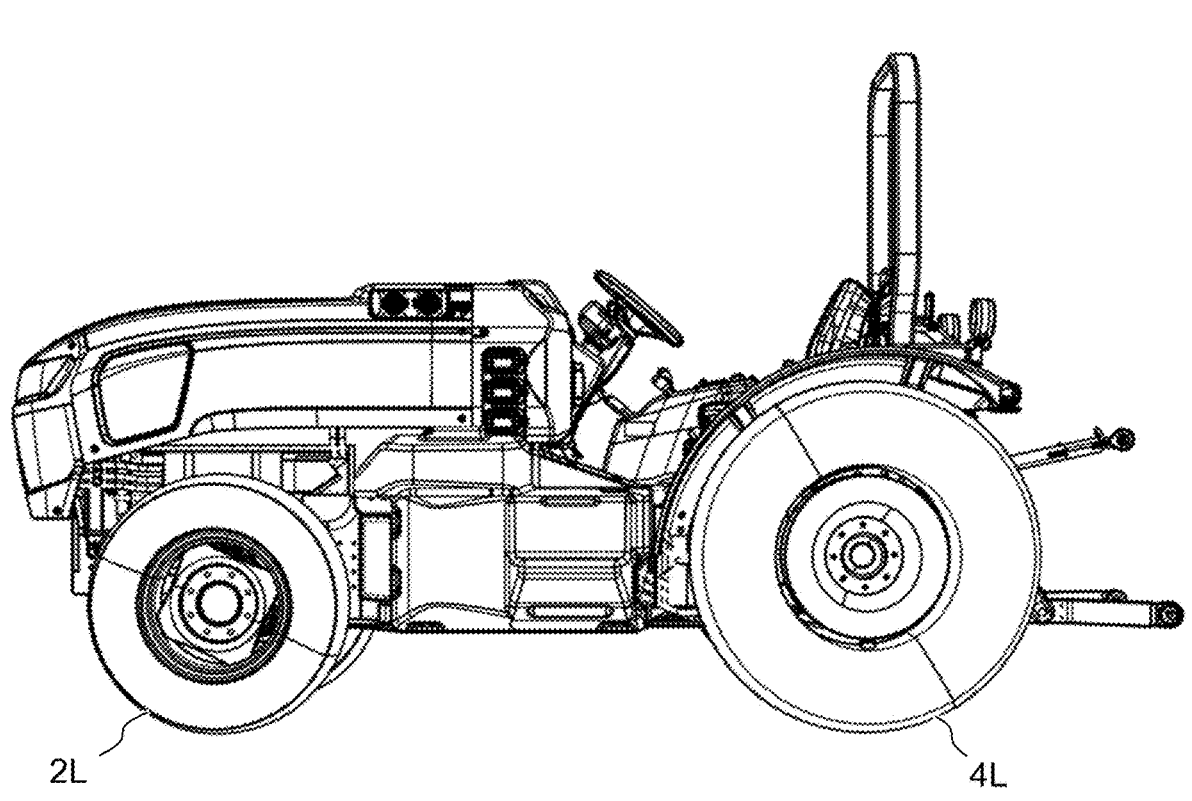
FIG. 1G shows a left side view of an electric work vehicle according to a preferred embodiment of the present invention.
Figure 1H:
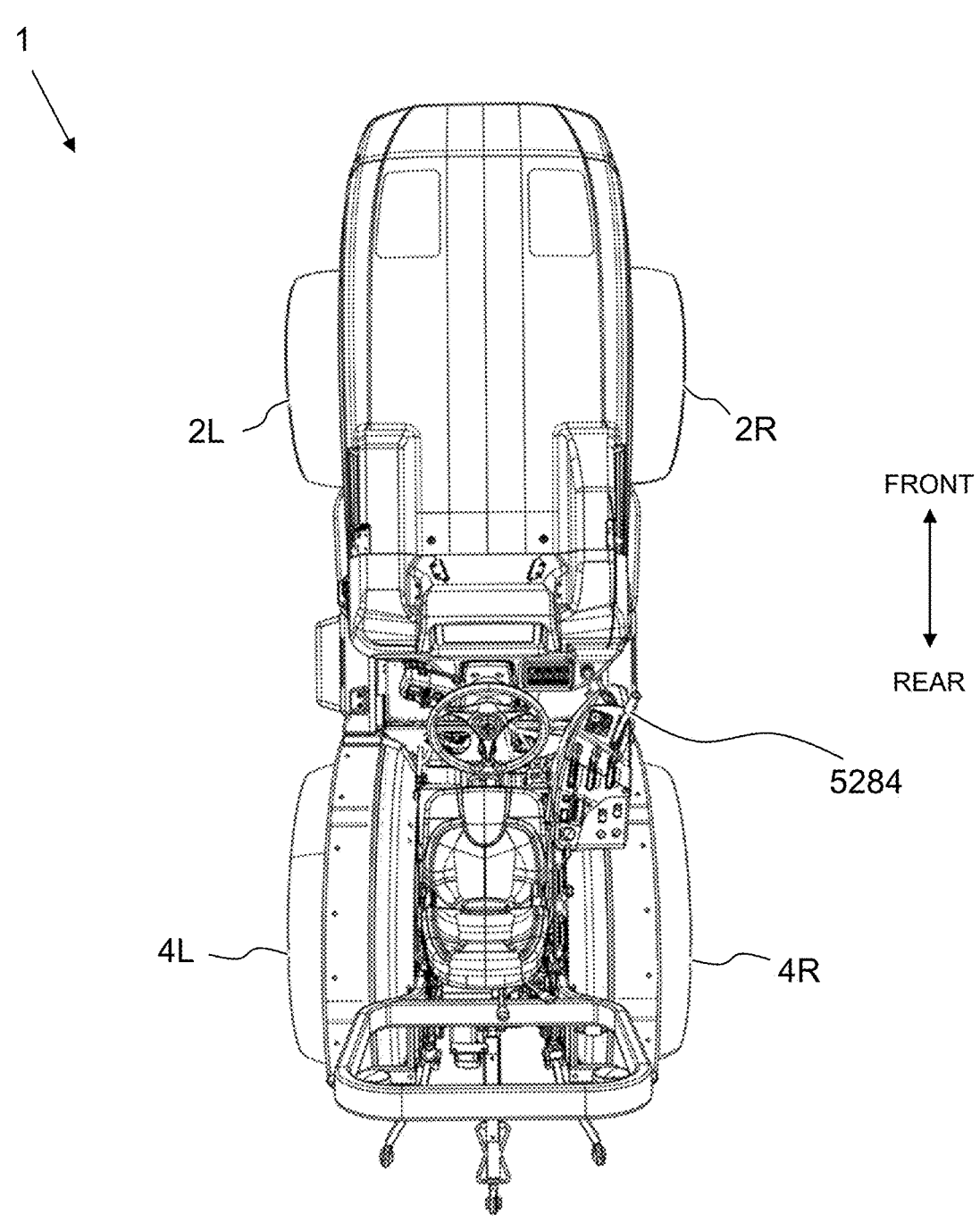
FIG. 1H shows a top view of an electric work vehicle according to a preferred embodiment of the present invention.
Figure 1I:
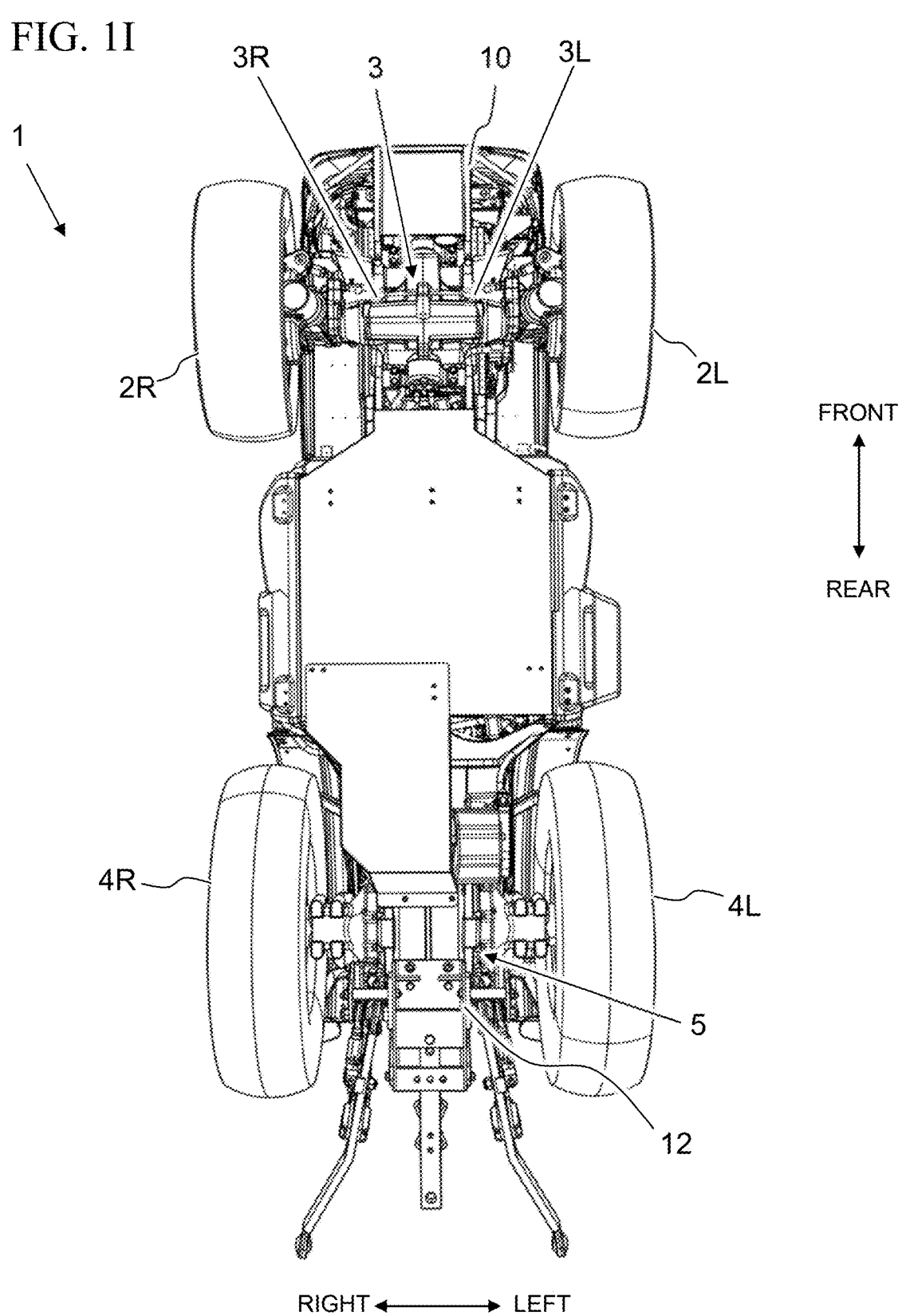
FIG. 1I shows a bottom view of an electric work vehicle according to a preferred embodiment of the present invention.

FIG. 1A to 1I show an electric work vehicle 1 according to a preferred embodiment of the present invention. FIGS. 1A and 1B show perspective views from left and right front ends of the vehicle 1, respectively. FIG. 1C shows an isometric view from a left rear end of the vehicle 1. FIG. 1D shows an isometric view from a right rear end of the vehicle 1. FIG. 1E shows a front view of the vehicle 1. FIGS. 1F and 1G are side views of the vehicle 1. FIGS. 1H and 1I are top and bottom views of the vehicle 1, respectively.

In a preferred embodiment of the present invention, as shown, for example, in FIGS. 1A-1H, the vehicle 1 includes a left front wheel 2L, a right front wheel 2R, a left rear wheel 4L, and a right rear wheel 4R. However, a vehicle according to the preferred embodiments of the present invention is not specifically limited to four wheels, and may include any appropriate number of wheels. For example, a vehicle according to the preferred embodiments may include only three wheels by removing one of the aforementioned four wheels, a fifth wheel (e.g., an additional wheel provided in line with a pair of one of the aforementioned four wheels or a wheel provided at a front or rear of the vehicle, etc.), six total wheels by including a pair of center wheels, and the like. In an alternative preferred embodiment, tracks can be used instead of wheels.

Figure 2:
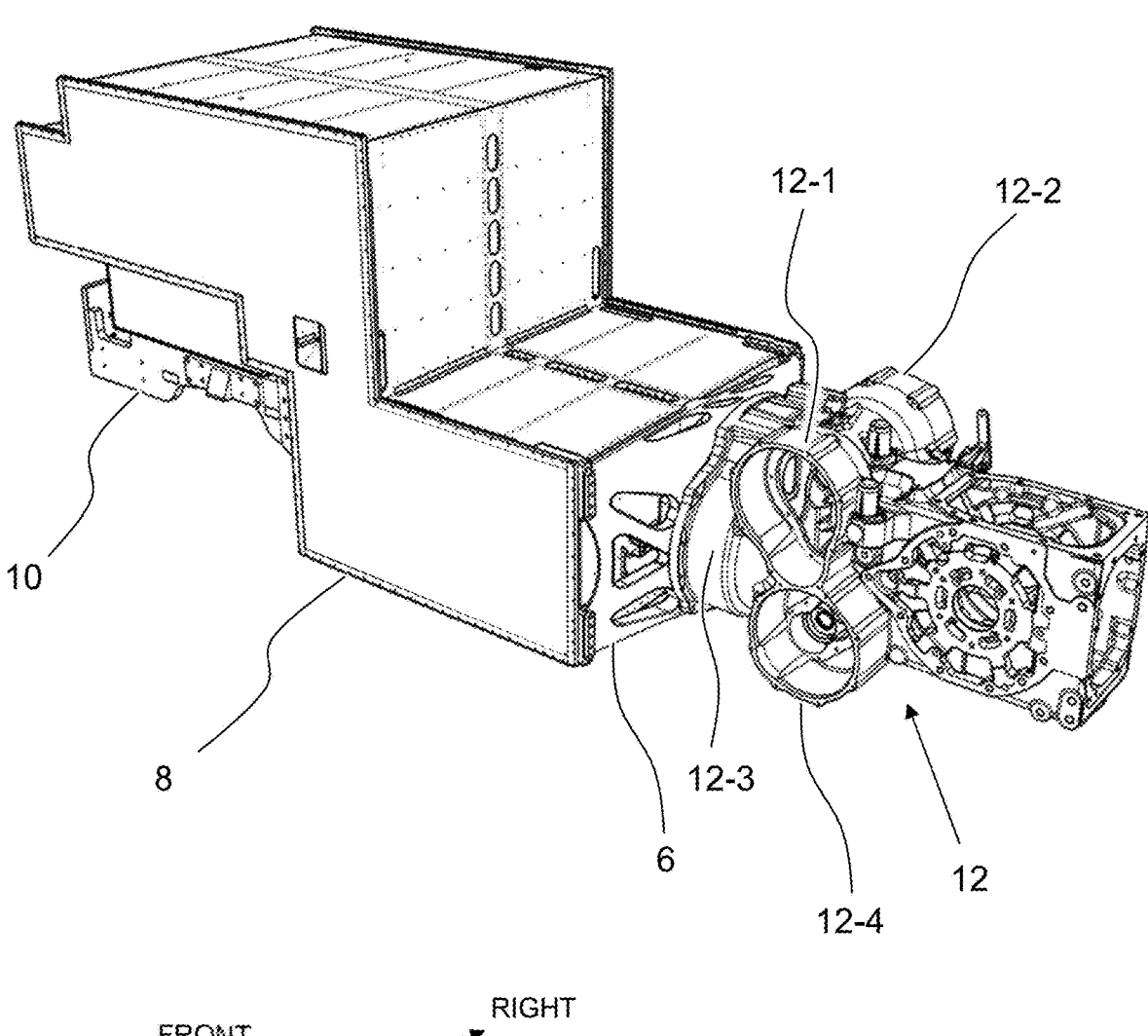
FIG. 2 shows a rear perspective view of an intermediate frame, a battery housing, a front frame, and a rear frame of an electric work vehicle according to a preferred embodiment of the present invention.

In a preferred embodiment of the present invention, the vehicle 1 includes an intermediate frame 6, a battery housing 8 attached to a front portion of the intermediate frame 6, a front frame 10 attached to the battery housing 8, and a rear housing 12 attached a rear portion of the intermediate frame 6, as shown in FIG. 2, for example. In a preferred embodiment, a front axle 3 connected to the left front wheel 2L and a right front wheel 2R is connected to and supports the front frame 10, and a rear axle 5 connected to the left rear wheel 4L and the right rear wheel 4R is connected to and supported by the rear housing 12, as shown in FIG. 1I, for example.

In a preferred embodiment of the present invention, the front axle 3 includes a left axle housing 3L and a right axle housing 3R, as shown in FIG. 1I. The left axle housing 3L houses a first electric motor 14 (a left-front-wheel electric motor) that is connected to a first gearing 15 to drive the left front wheel 2L, and the right axle housing 3R houses a second electric motor 16 (a right-front-wheel electric motor) that is connected to a second gearing 17 to drive the right front wheel 2R. The first electric motor 14, the second electric motor 16, the first gearing 15, and the second gearing 17 are shown, for example, in FIG. 1J in which the left axle housing 3L and the right axle housing 3R have been removed for illustrative purposes.

Figure 1J:
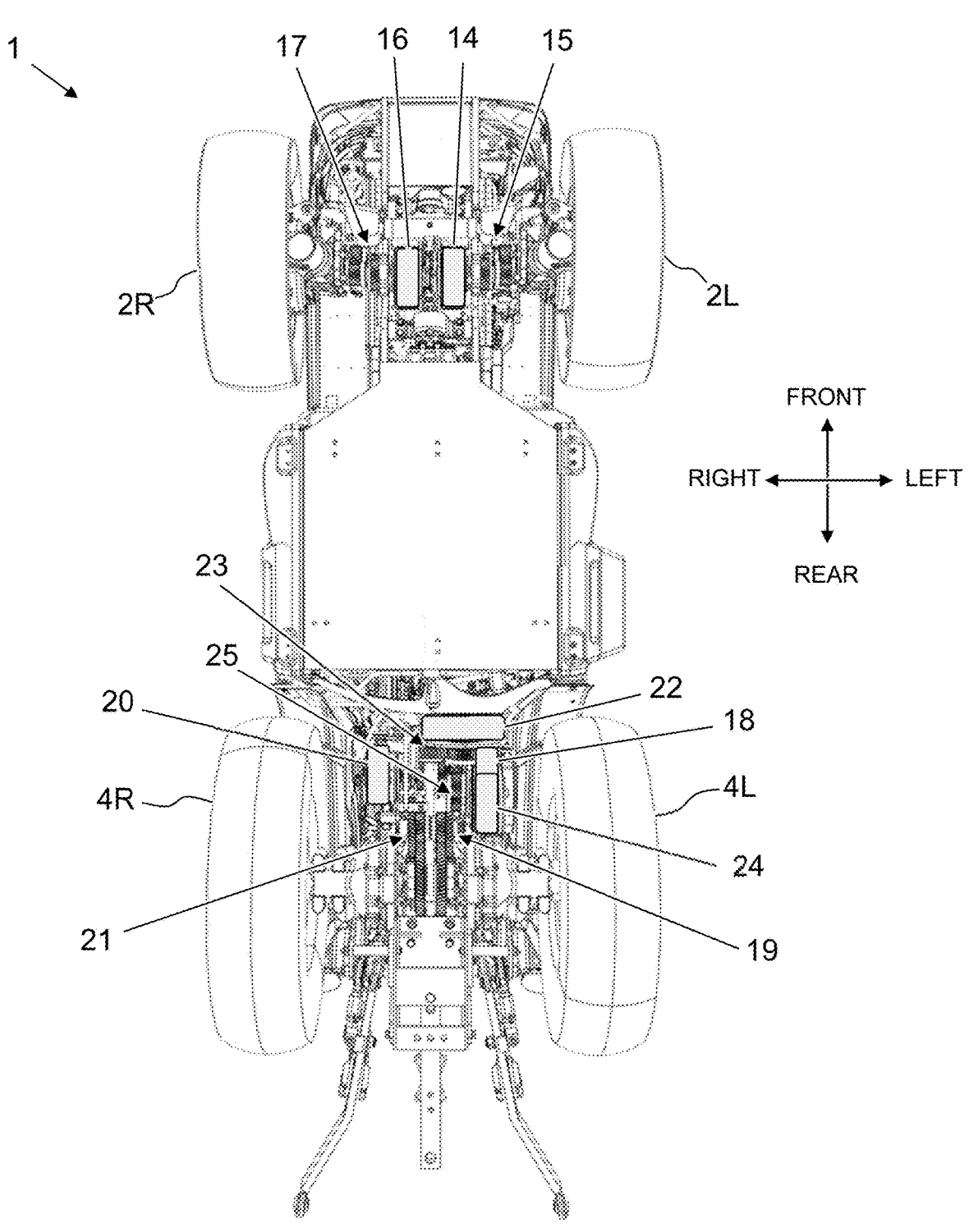
FIG. 1J shows a bottom view of an electric work vehicle according to a preferred embodiment of the present invention in which certain elements have been removed for illustrative purposes.

In a preferred embodiment of the present invention, the rear housing 12 includes a first motor housing portion 12-1 to house a third electric motor 18 (a left-rear-wheel electric motor) that is connected to a third gearing 19 to drive the left rear wheel 4L, and a second motor housing portion 12-2 to house a fourth electric motor 20 (a right-rear-wheel electric motor) that is connected to a fourth gearing 21 to drive the right rear wheel 4R. Preferably, the rear housing 12 also includes a third motor housing portion 12-3 to house a fifth electric motor 22 that is connected to a fifth gearing 23 to drive a first electric work vehicle component (e.g., a power take-off (PTO)), and a fourth motor housing portion 12-4 to house a sixth electric motor 24 that is connected to a sixth gearing 25 to drive a second electric work vehicle component (e.g., a hydraulic system), as shown in FIGS. 1J and 2, for example. The third electric motor 18, the fourth electric motor 20, the fifth electric motor 22, and the sixth electric motor 24 are shown, for example, in FIG. 1J in which elements including the rear housing 12 have been removed for illustrative purposes. In the bottom view of FIG. 1J, the sixth electric motor 24 overlaps the third electric motor 18.

Figure 3:
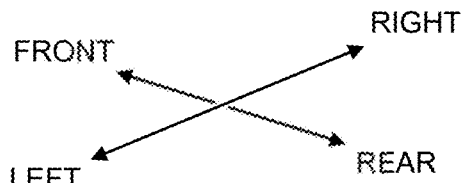
FIG. 3 shows a rear perspective view of a battery housing and a front frame of an electric work vehicle according to a preferred embodiment of the present invention.
Figure 4:
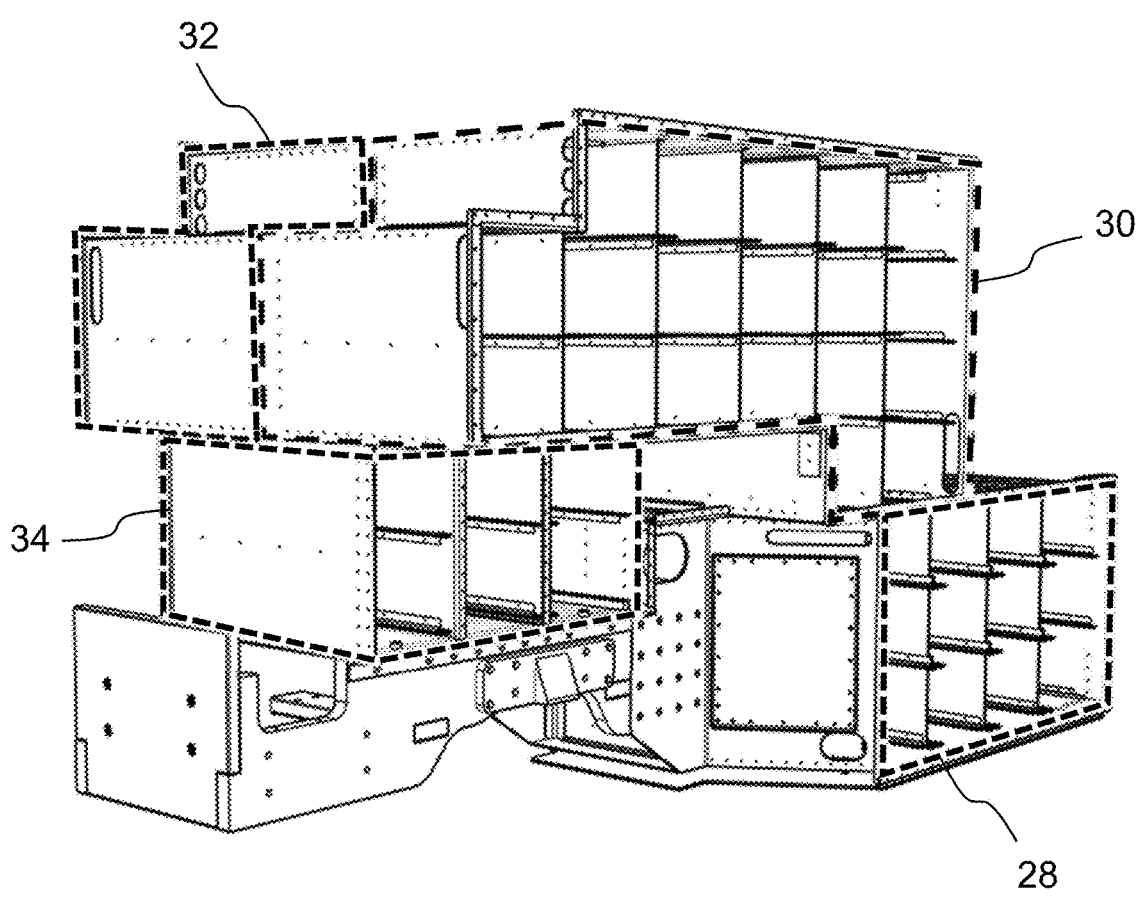
FIG. 4 shows a front perspective view of a battery housing according to a preferred embodiment of the present invention.
Figure 5A:
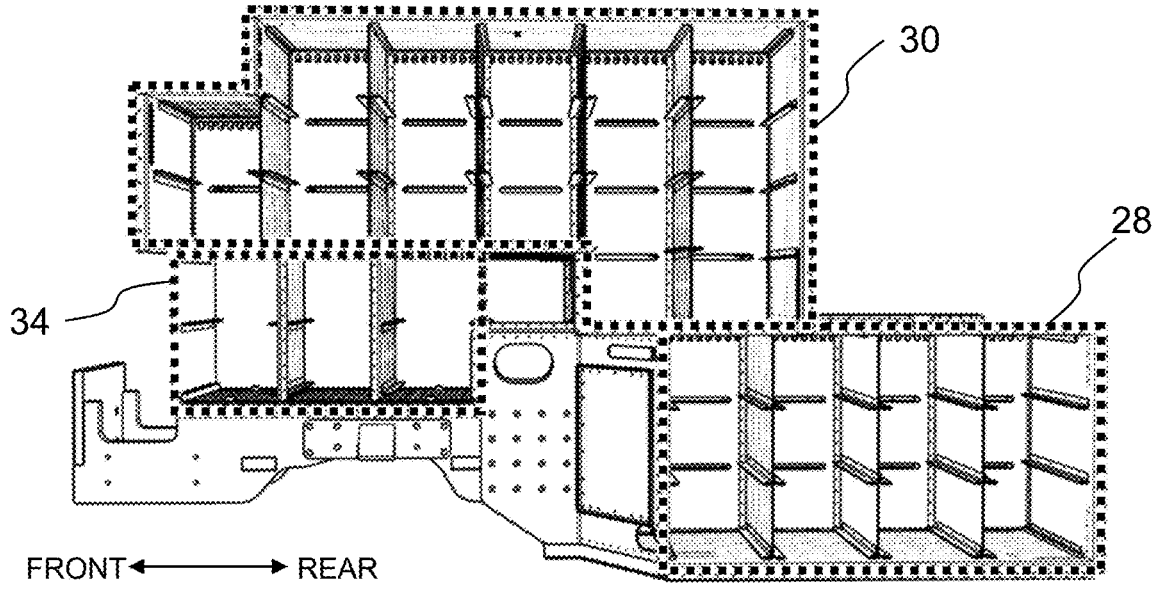
FIG. 5A shows a left side view of a battery housing according to a preferred embodiment of the present invention.
Figure 5B:
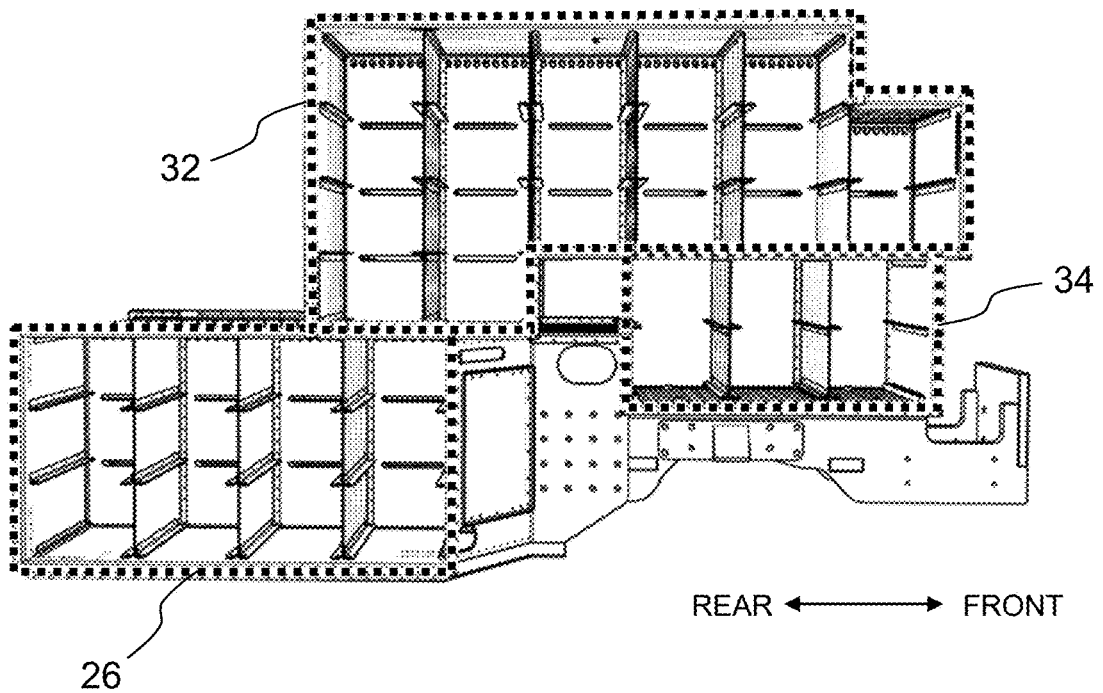
FIG. 5B shows a right side view of a battery housing according to a preferred embodiment of the present invention.

In a preferred embodiment of the present invention, the battery housing 8 includes a first battery housing portion 26, a second battery housing portion 28, a third battery housing portion 30, a fourth battery housing portion 32, and a fifth battery housing portion 34, each of which is shown in FIG. 3 using dashed lines. In a preferred embodiment, the first battery housing portion 26 and the second battery housing portion 28 are adjacent to each other in a width direction of the vehicle, and the third battery housing portion 30 and the fourth battery housing portion 32 are adjacent to each other in a width direction of the vehicle. In a preferred embodiment, a width of each of the first battery housing portion 26, the second battery housing portion 28, the third battery housing portion 30, the fourth battery housing portion 32, and the fifth battery housing portion 34 width direction of the vehicle is equal or substantially equal. FIGS. 4, 5A, and 5B show the battery housing 8 with the battery housing portion covers removed for illustrative purposes.

In a preferred embodiment, the first battery housing portion 26 and the second battery housing portion 28 are included in a first battery housing section 8-1 (a rear battery housing section), the third battery housing portion 30 and the fourth battery housing portion 32 are included in a second battery housing section 8-2 (a forward-upper battery housing section), and the fifth battery housing portion 34 is included in a third battery housing section 8-3 (a forward-lower battery housing section), as shown in FIG. 3, for example. In a preferred embodiment, a width of the first battery housing section 8-1 is equal or substantially equal to a width of the second battery housing section 8-2, and a width of the third battery housing section 8-3 is less than a width of the first battery housing section 8-1 and a width of the second battery housing section 8-2. Preferably, a rear surface of the third battery housing section 8-3 is spaced away from a front surface of the first battery housing section 8-1. In a preferred embodiment, a rear surface of the second battery housing section 8-2 intersects a middle portion of the first battery housing section 8-1 in a front-rear direction of the electric work vehicle in a top view and side view.

As shown in FIGS. 4, 5A, and 5B, each of the first battery housing portion 26, the second battery housing portion 28, the third battery housing portion 30, the fourth battery housing portion 32, and the fifth battery housing portion 34 includes a plurality of battery housing module compartments, which are each to receive a battery module. In a preferred embodiment, each of the third battery housing portion 30 and the fourth battery housing portion 32 includes more battery housing module compartments than each of the first battery housing portion 26 and the second battery housing portion 28. Preferably, the fifth battery housing portion 34 includes less battery housing module compartments than each of the first battery housing portion 26 and the second battery housing portion 28.

Figure 5C:
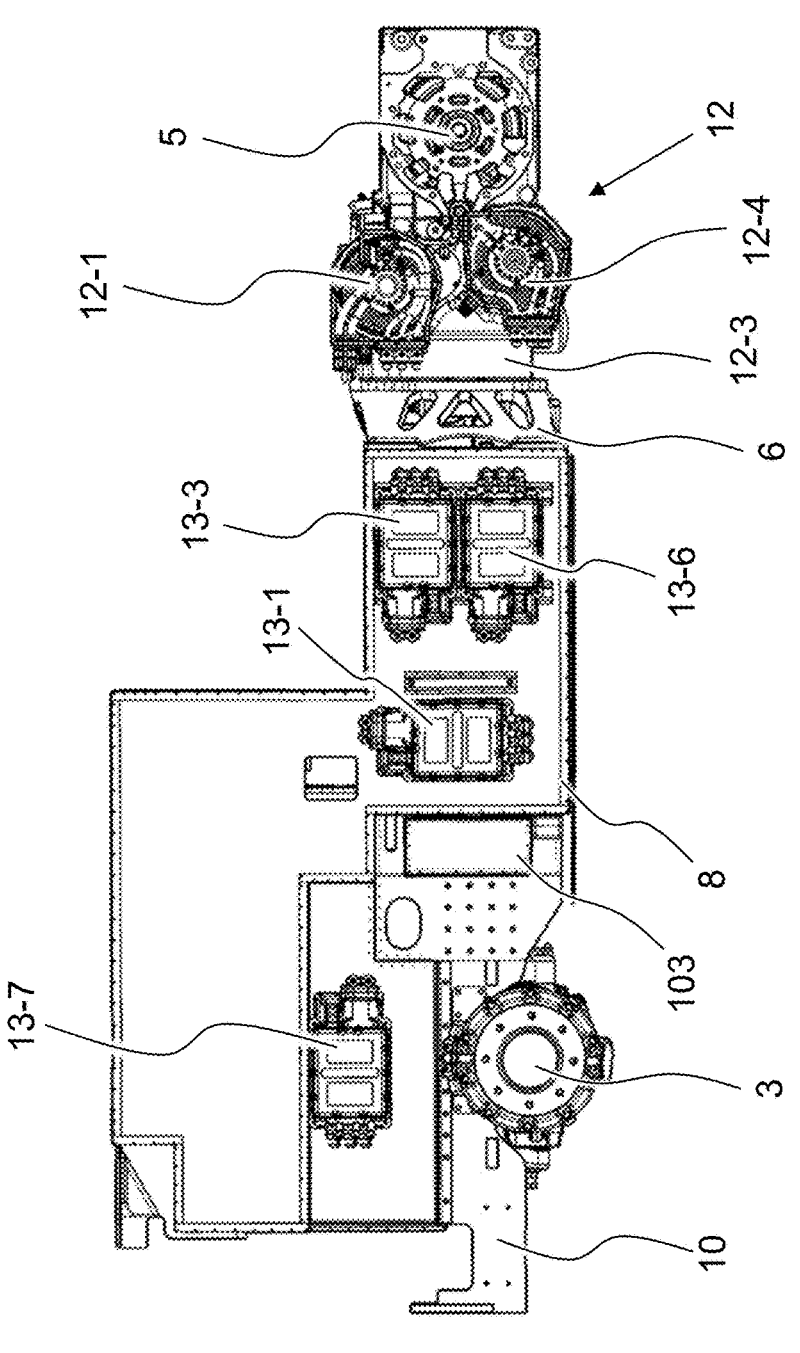
FIG. 5C shows a left side view of an intermediate frame, a battery housing, a front frame, and a rear frame of an electric work vehicle according to a preferred embodiment of the present invention.
Figure 5C:
Figure 5C:
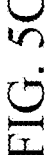
Figure 5D:
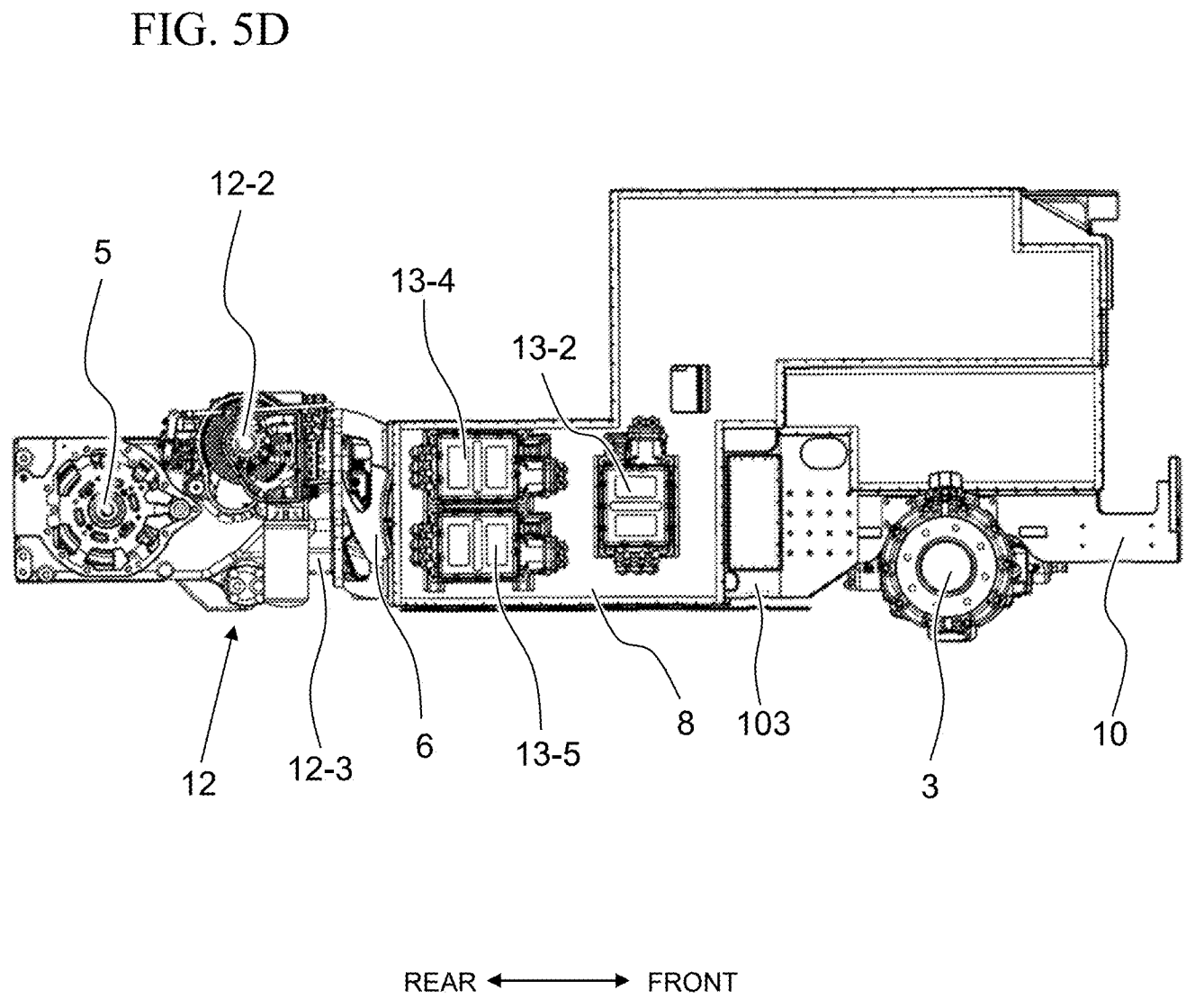

In a preferred embodiment of the present invention, as shown, for example, in FIGS. 5C and 5D, one or more inverters 13 are connected to, attached on, or supported by the battery housing 8. For example, the one or more inverters 13 can include a first inverter 13-1, a second inverter 13-2, a third inverter 13-3, a fourth inverter 13-4, a fifth inverter 13-5, a sixth inverter 13-6, and a seventh inverter 13-7. Preferably, as shown in FIG. 5C, the first inverter 13-1, the third inverter 13-3, the sixth inverter 13-6, and the seventh inverter 13-7 are located on a left side of the battery housing

8. Preferably, as shown in FIG. 5D, the second inverter 13-2, the fourth inverter 13-4, and the fifth inverter 13-5 are located on a right side of the battery housing 8. More specifically, as shown in FIGS. 5C and 5D, the seventh inverter 13-7 can be attached to a left side cover of the fifth battery housing portion 34, each of the first inverter 13-1, the third inverter 13-3, and the sixth inverter 13-6 can be attached to a left side cover of the second battery housing portion 28, and each of the second inverter 13-2, the fourth inverter 13-4, and the fifth inverter 13-5 can be attached to a right side cover of the first battery housing portion 26. However, the total number of the inverters 13 is not limited, and the inverters 13 may be provided at other locations within the vehicle 1.

In preferred embodiment of the present invention, the first inverter 13-1 can provide electric power to the first electric motor 14, the second inverter 13-2 can provide electric power to the second electric motor 16, the third inverter 13-3 can provide electric power to the third electric motor 18, the fourth inverter 13-4 can provide electric power to the fourth electric motor 20, the fifth inverter 13-5 can provide electric power to the fifth electric motor 22, and the sixth inverter 13-6 can provide electric power to the sixth electric motor 24. The seventh inverter 13-7 can provide electric power to other components of the electric work vehicle 1, for example, a cooling structure such as a radiator/condenser fan.

Figure 6:
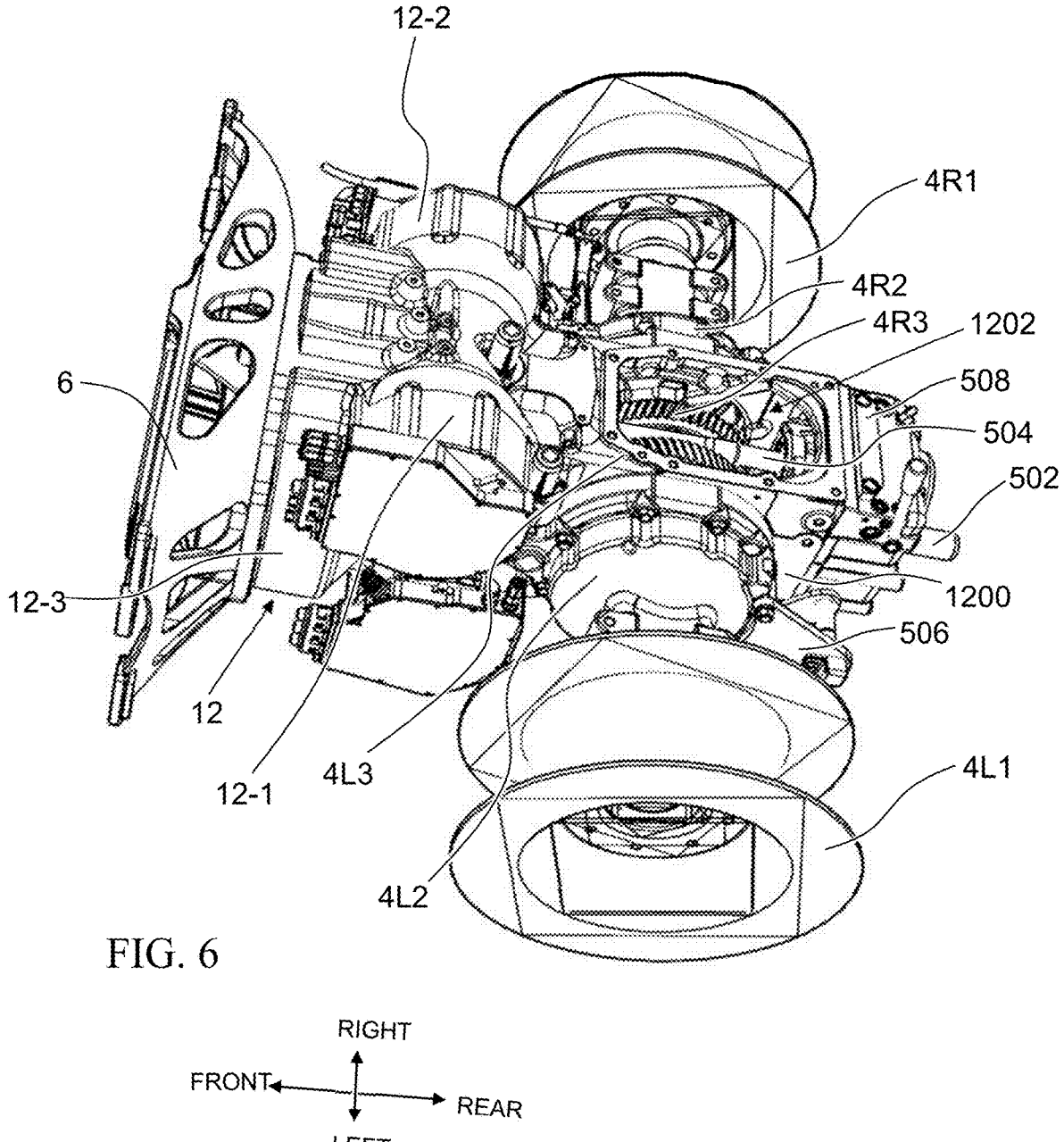
FIG. 6 shows a top left perspective view of portions of a rear of a partially disassembled electric work vehicle according to a preferred embodiment of the present invention.
Figure 7:
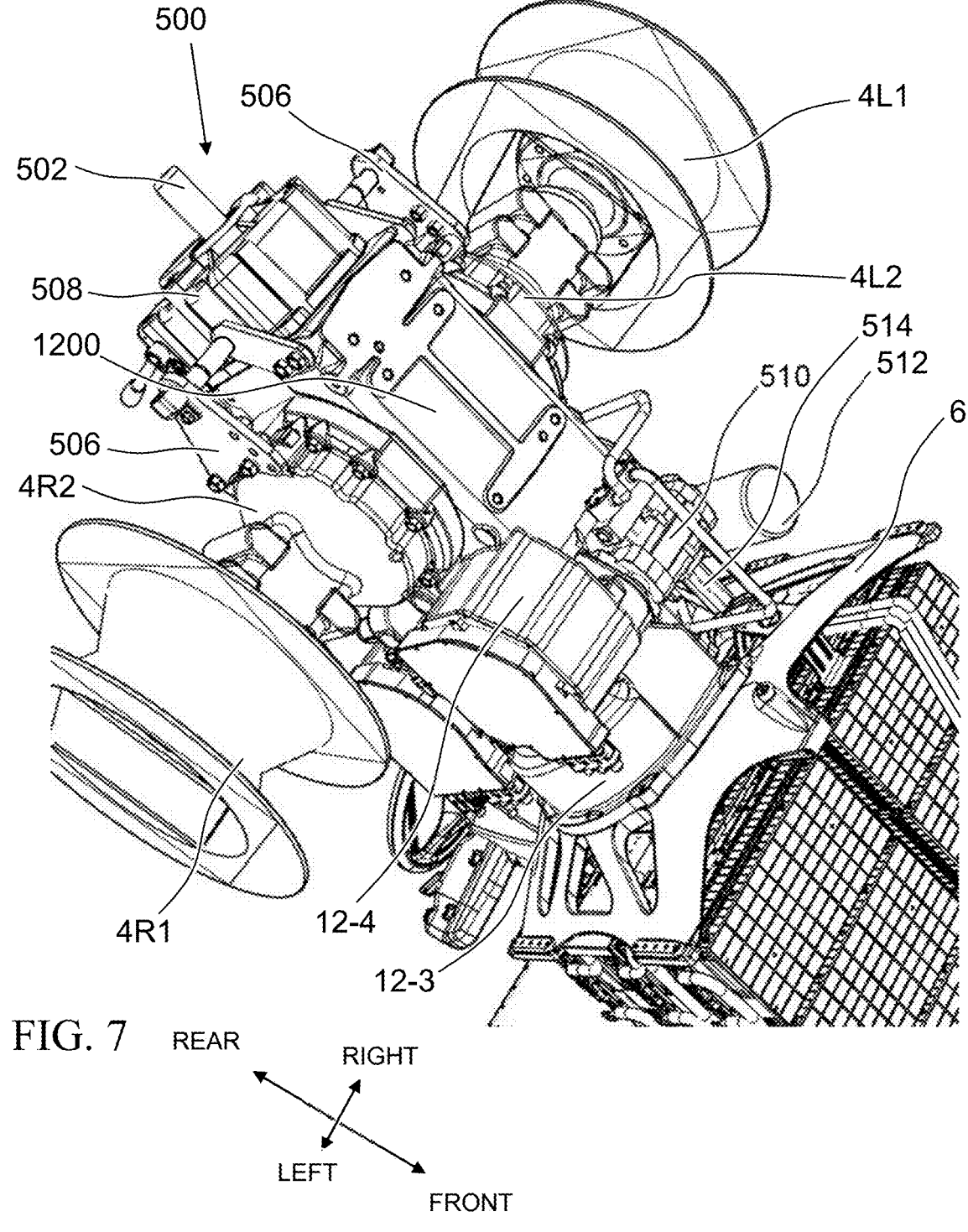
FIG. 7 shows a bottom right perspective view of portions of a rear of a partially disassembled electric work vehicle according to a preferred embodiment of the present invention.
Figure 8:
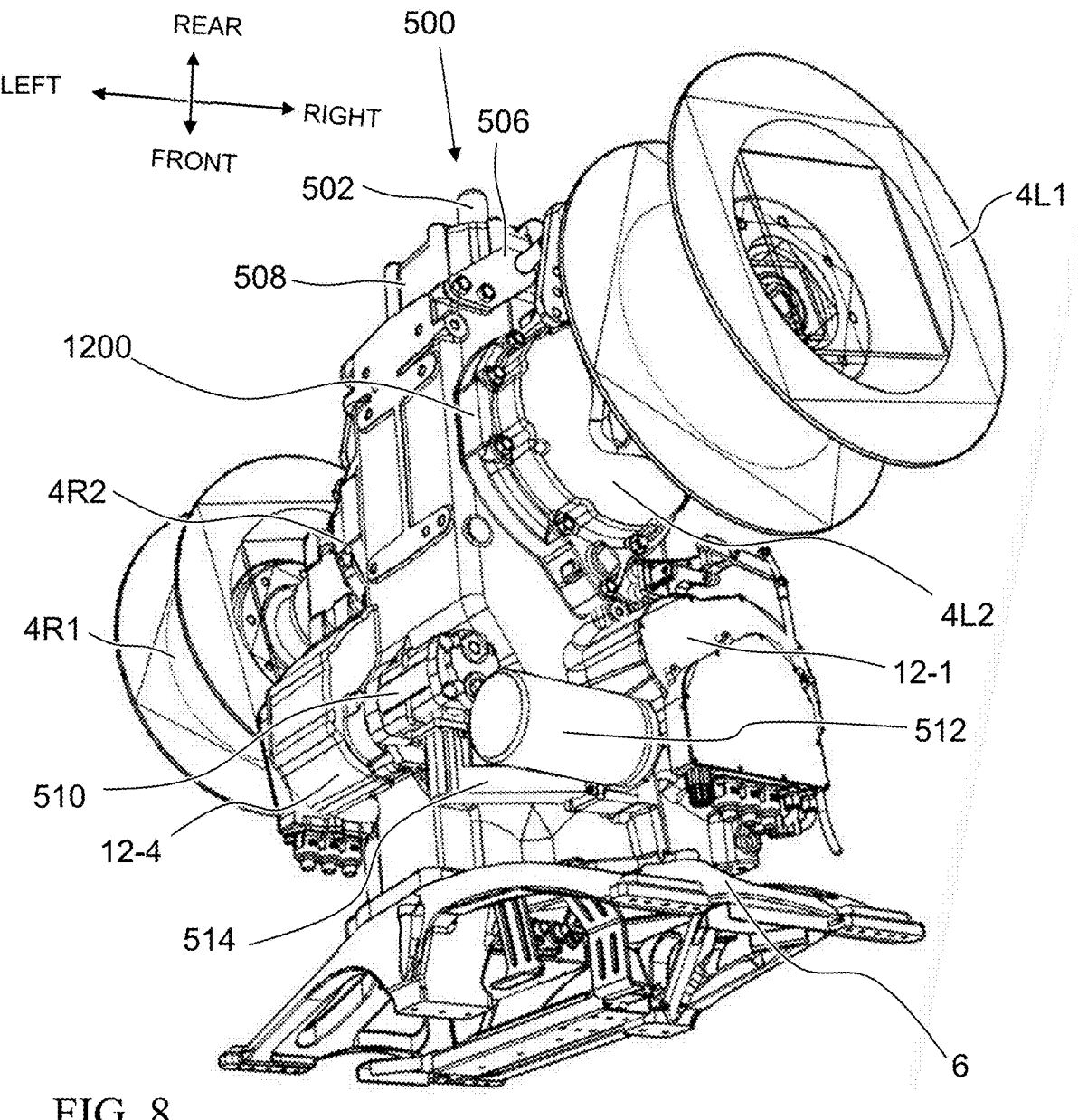
FIG. 8 shows a bottom left perspective view of portions of a rear of a partially disassembled electric work vehicle according to a preferred embodiment of the present invention.

In a preferred embodiment of the present invention, a front portion of the rear housing 12 is connected to a rear portion of the intermediate frame 6 and a front portion of the intermediate frame 6 is connected to a rear portion of the battery housing 8. FIGS. 6-8 show components which are affixed to and housed within the rear housing 12. The components affixed to and housed within the rear housing 12 preferably include, for example, a left hub and casing 4L2, a right hub and casing 4R2, the third through sixth electric motors 18, 20, 22, and 24, the third through sixth gearings 19, 21, 23, and 25, a Power Take-Off (PTO) 500, a hydraulic pump 510, a parking assembly 520, a gear shifting assembly 530, and a rear driving gear assembly 540 including components from and interacting with the third through sixth gearings 19, 21, 23, and 25.

The left hub and casing 4L2 and the right hub and casing 4R2 are respectively connected to a left rear rim 4L1 which supports the left rear wheel 4L and a right rear rim 4R1 which supports the right rear wheel 4R. Inner ends of the left hub and casing 4L2 and the right hub and casing 4R2 are respectively connected to left and right sides of a gear casing 1200 of the rear housing 12. The gear casing 1200 preferably includes wheel hub access openings 1208 which permit driveshafts to extend from an inside of the gear casing 1200 into the left hub and casing 4L2 and the right hub and casing 4R2.

In a preferred embodiment of the present invention, the third electric motor 18 and the fourth electric motor 20 are structured to respectively drive the left rear wheel 4L and the right rear wheel 4R. The third electric motor 18 and the fourth electric motor 20 are respectively housed/located in a first motor housing portion 12-1 and a second motor housing portion 12-2 adjacent to a front of the rear housing 12. Further, the sixth electric motor 24, which is preferably structured to drive a hydraulic pump 510 (discussed later), is located in a fourth motor housing portion 12-4 which is below one of the third electric motor 18 and the fourth electric motor 20 in an up-down direction of the electrical vehicle such that the sixth electric motor 24 is located closer to the one of the third electric motor 18 and the fourth electric motor 20 than it is to the other one of the third electric motor 18 and the fourth electric motor 20.

In a preferred embodiment of the present invention, the fifth electric motor 22 is structured to drive the PTO 500. The fifth electric motor 22 is preferably mounted in the third motor housing portion 12-3 located at the front of the rear housing 12. As shown, for example, in FIG. 26, the fifth electric motor 22 transmits rotational energy to the PTO 500 through the fifth gearing 23. The fifth gearing 23 preferably includes a PTO motor gear 2302 which is driven by an output shaft of the fifth electric motor 22 and a PTO input shaft gear 2300 which is driven by the PTO motor gear 2302. The fifth electric motor 22 is preferably larger and has a greater torque output and power rating than each of the third electric motor 18, the fourth electric motor 20, and the sixth electric motor 24.

Figure 10:
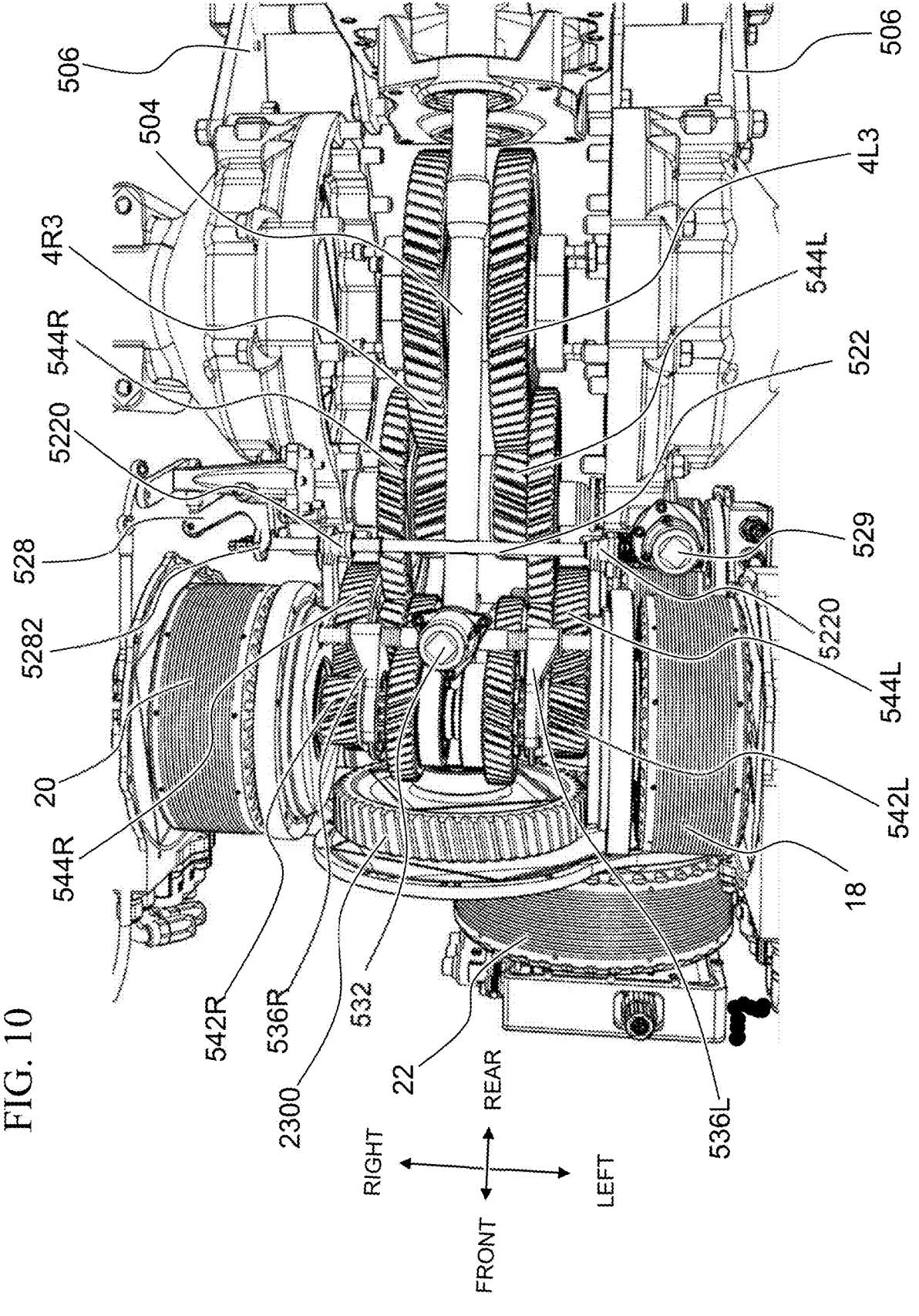
FIG. 10 shows a top perspective view of a rear gearing assembly of a partially disassembled electric work vehicle according to a preferred embodiment of the present invention.
Figure 11:
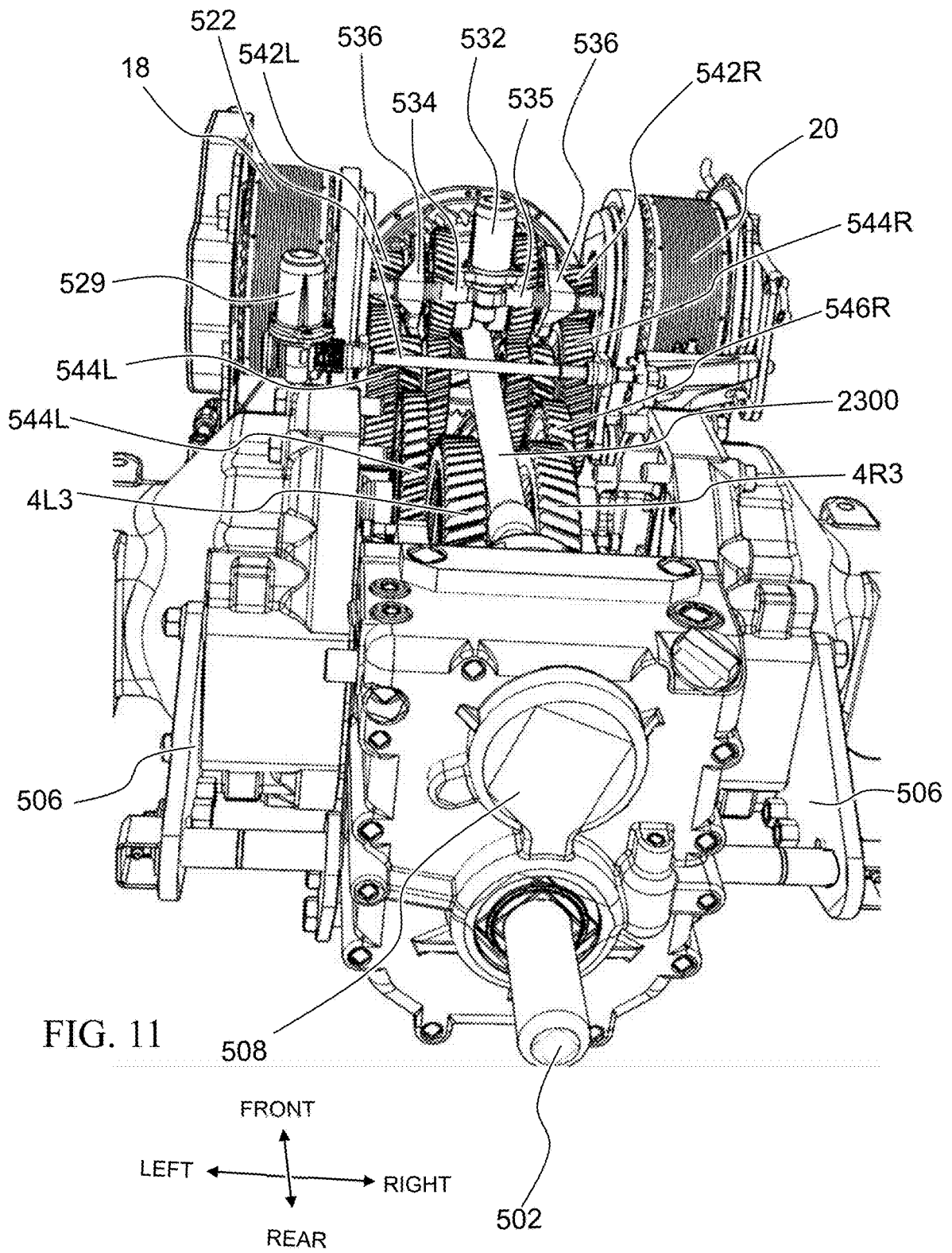
FIG. 11 shows a rear perspective view of a rear gearing assembly of a partially disassembled electric work vehicle according to a preferred embodiment of the present invention.
Figure 12:
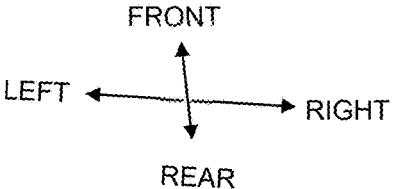
FIG. 12 shows a top perspective view of a rear gearing assembly of a partially disassembled electric work vehicle according to a preferred embodiment of the present invention.
Figure 13A:
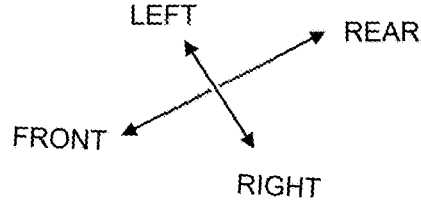
FIG. 13A shows a bottom perspective view of a rear gearing assembly of a partially disassembled electric work vehicle according to a preferred embodiment of the present invention.
Figure 13B:
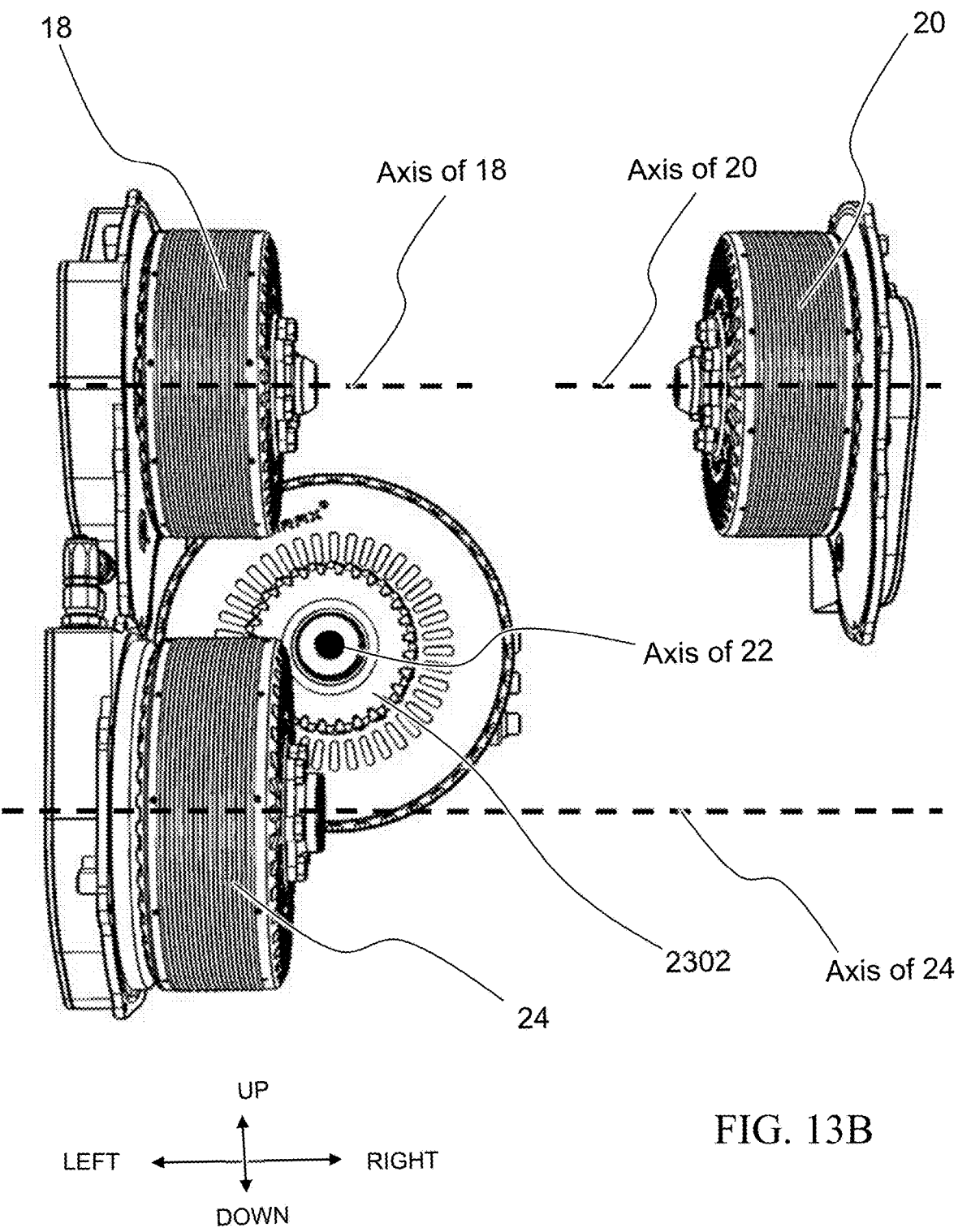
FIG. 13B shows a rear perspective view of an arrangement of rear motors of an electric work vehicle according to a preferred embodiment of the present invention.
Figure 13C:
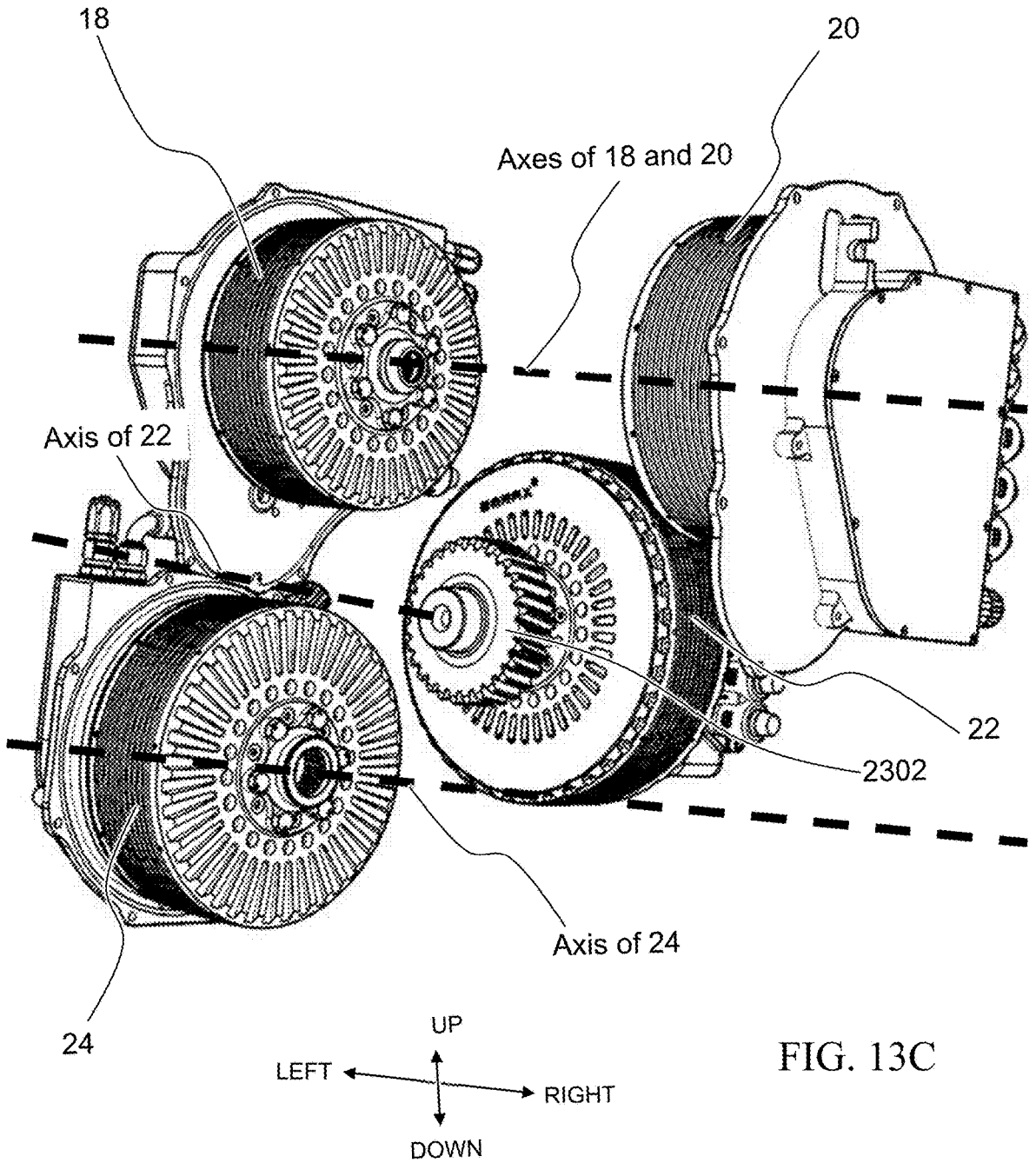
FIG. 13C shows a right rear perspective view of an arrangement of rear motors of an electric work vehicle according to a preferred embodiment of the present invention.

As shown in FIGS. 13B and 13C, for example, a central axis of the fifth electric motor 22 is preferably located below central axes of the third electric motor 18 and the fourth electric motor 20 as shown, for example, in FIGS. 10-12. The central axis of the fifth electric motor 22 preferably extends perpendicularly or substantially perpendicularly to the central axes of the third electric motor 18 and the fourth electric motor 20 as shown, for example, in FIGS. 10-13C. A central axis of the sixth electric motor 24 preferably extends in parallel or substantially in parallel with the central axes of the third electric motor 18 and the fourth electric motor 20 as shown, for example, in FIGS. 10-12. The central axes of the third electric motor 18 and the fourth electric motor 20 are preferably aligned and colinear with one another as shown, for example, in FIGS. 10-12. Central axes of the fifth electric motor 22 and the sixth electric motor 24 are preferably located below the third electric motor 18 and the fourth electric motor 20 in the up-down direction of the electrical vehicle as shown, for example, in FIGS. 10-12.

Figure 9:
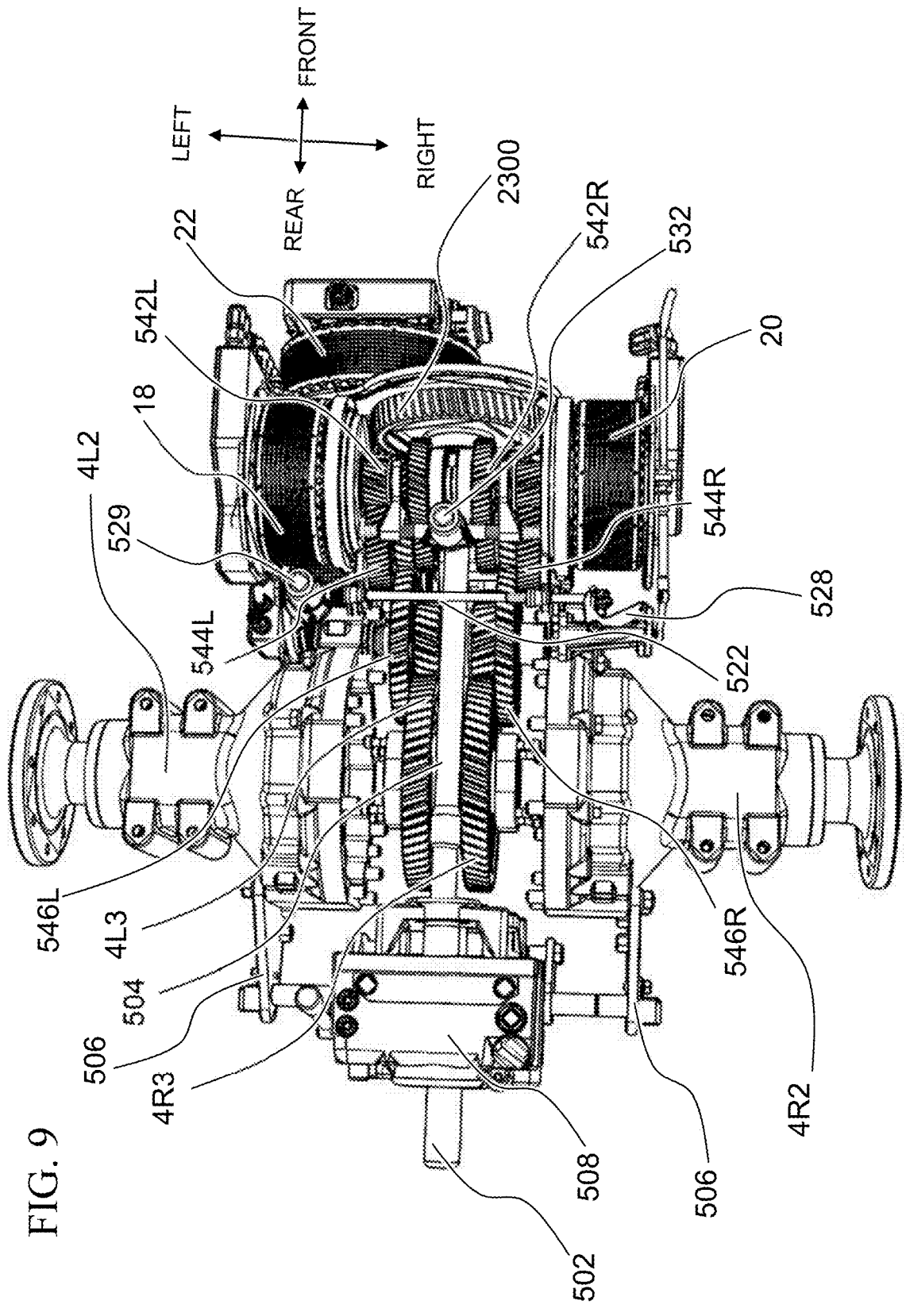
FIG. 9 shows a top perspective view of portions of a rear of a partially disassembled electric work vehicle according to a preferred embodiment of the present invention.
Figure 17A:
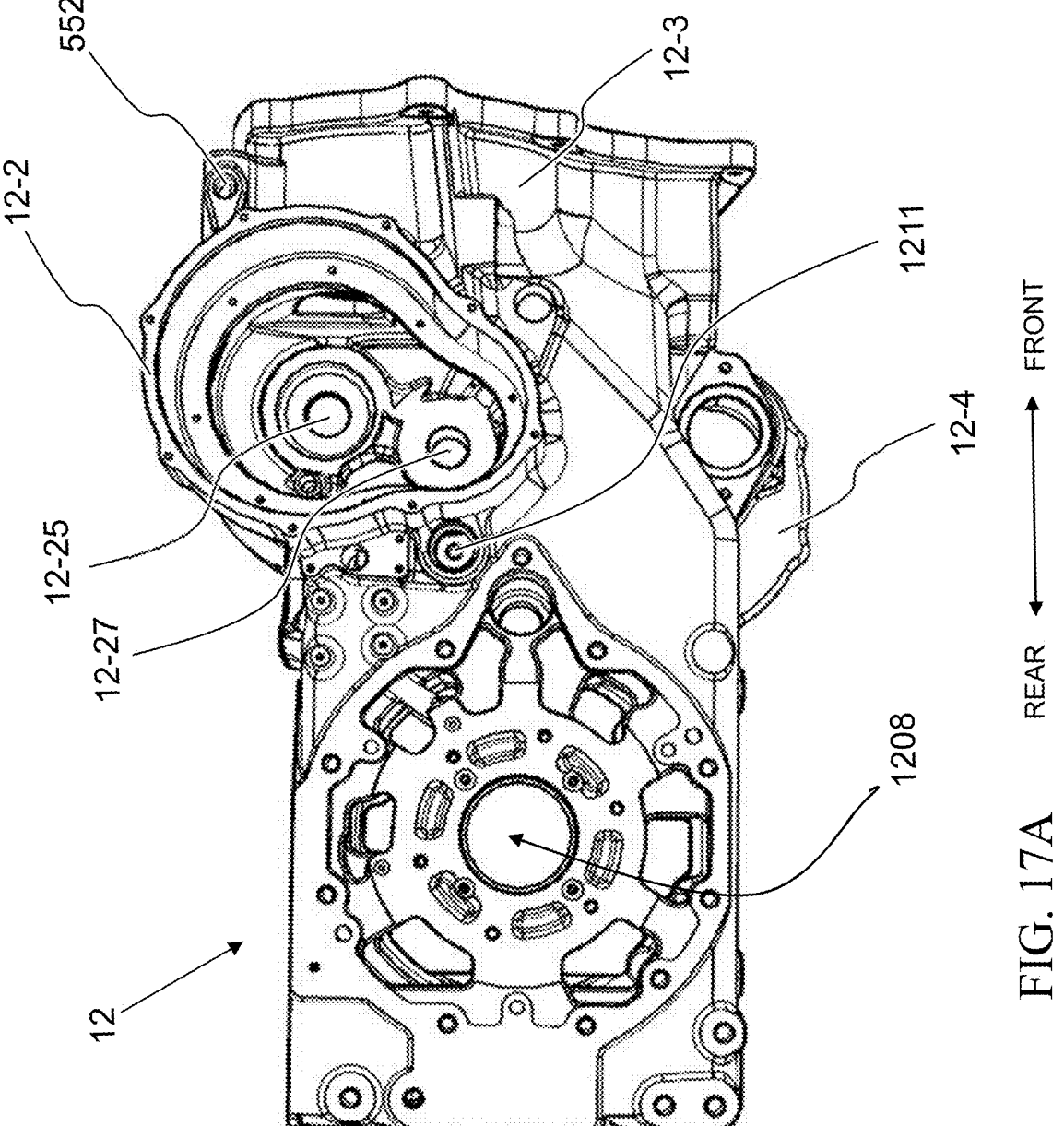
FIG. 17A shows a right view of a rear frame according to a preferred embodiment of the present invention.
Figure 17B:
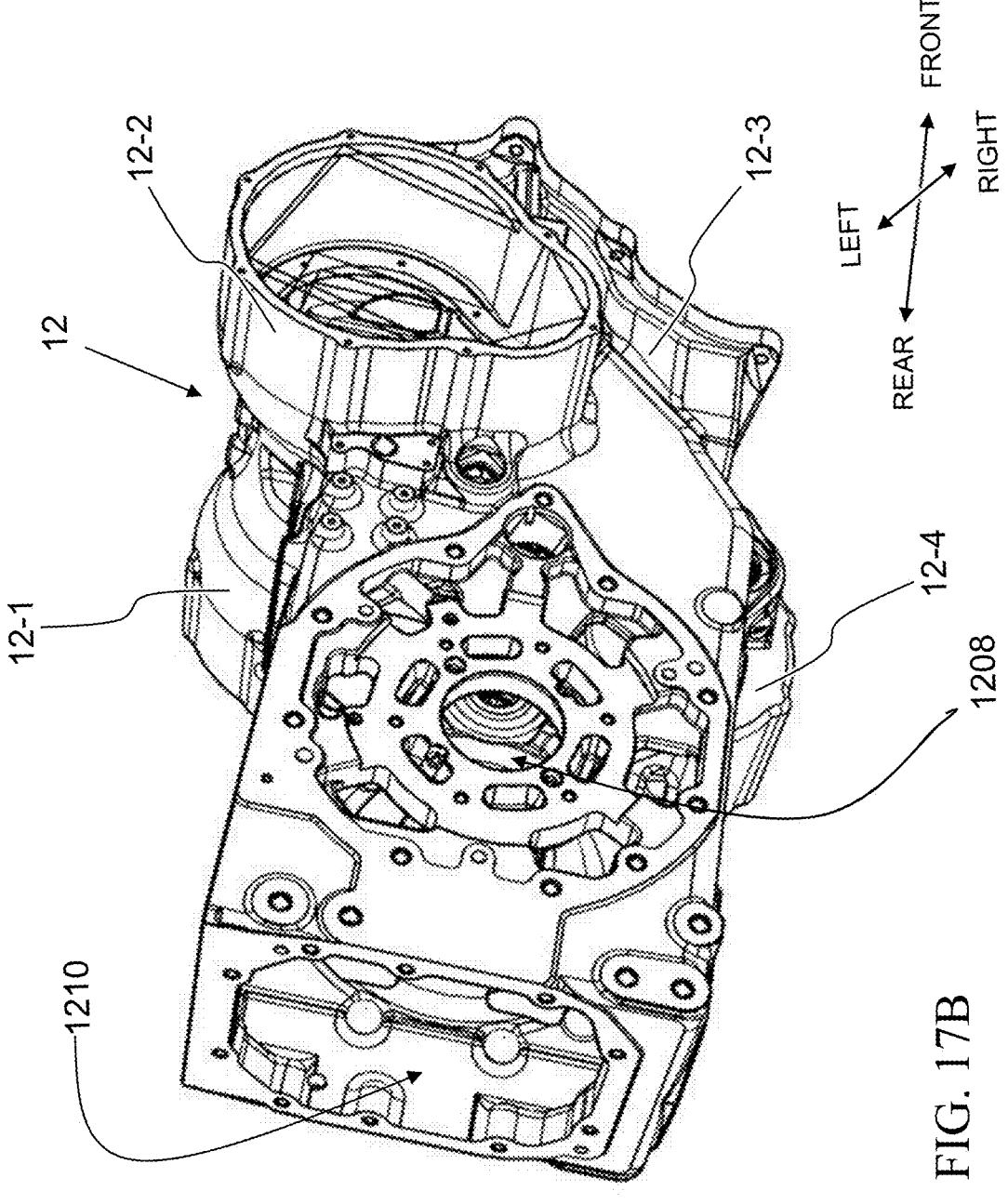
FIG. 17B shows a right perspective view of a rear frame according to a preferred embodiment of the present invention.
Figure 19:
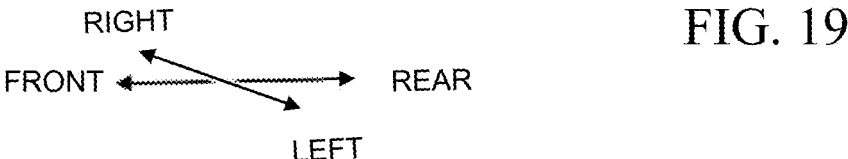
FIG. 19 shows a left perspective view of a rear frame according to a preferred embodiment of the present invention.
Figure 20:
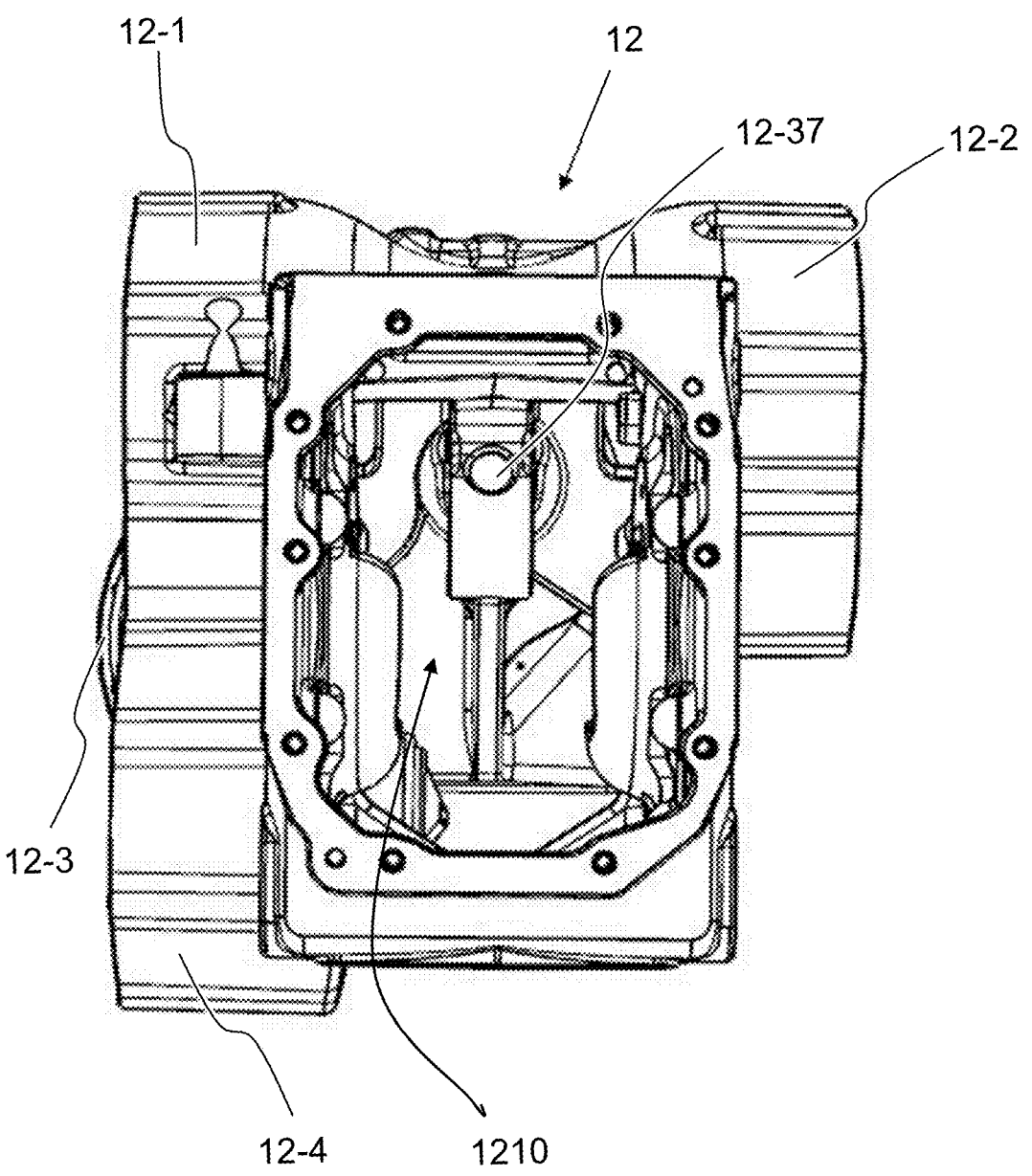
FIG. 20 shows a rear view of a rear frame according to a preferred embodiment of the present invention.
Figure 25:
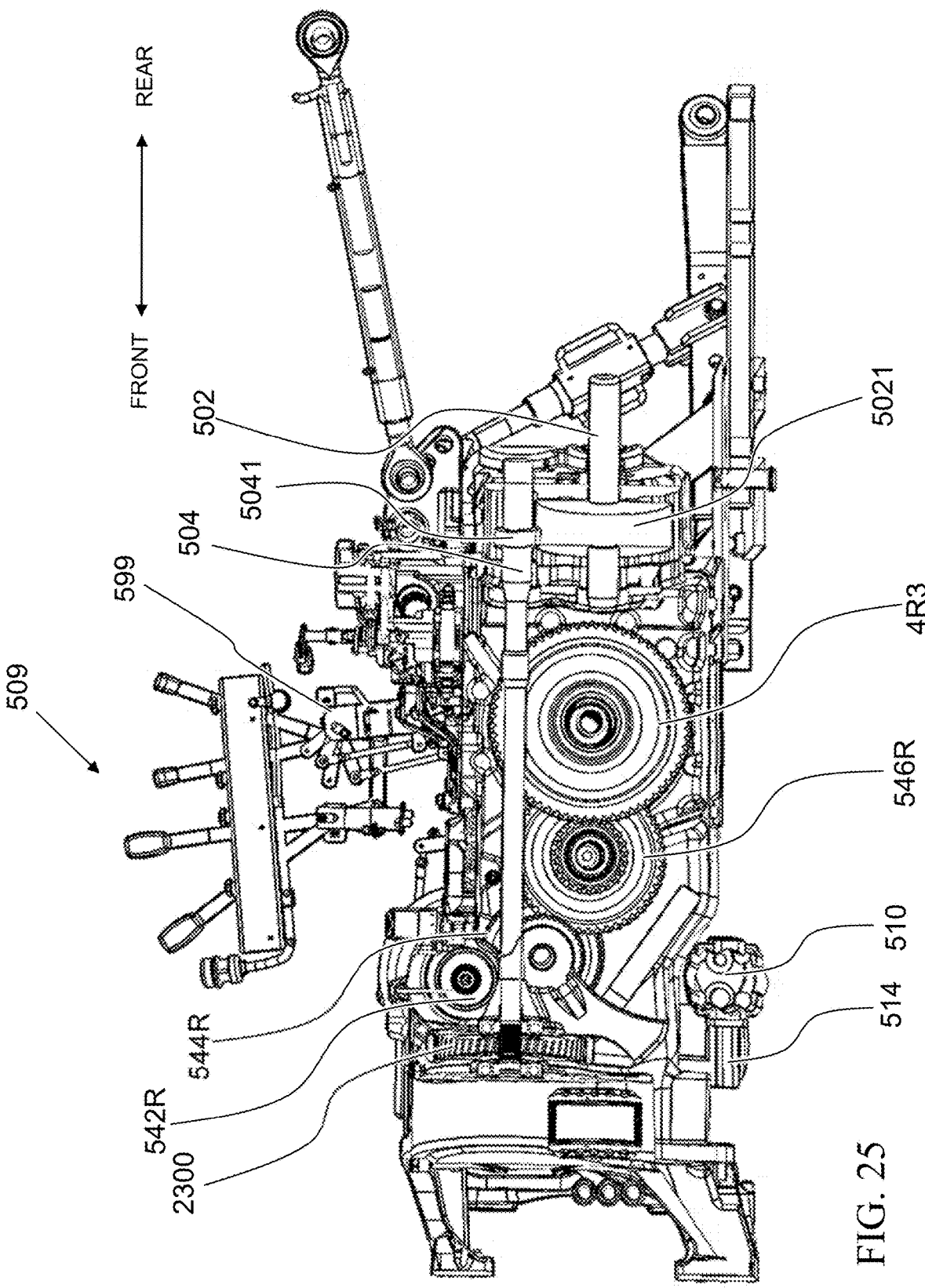
FIG. 25 shows a cross sectional view of components retained within a rear frame of an electric work vehicle according to a preferred embodiment of the present invention.
Figure 26:
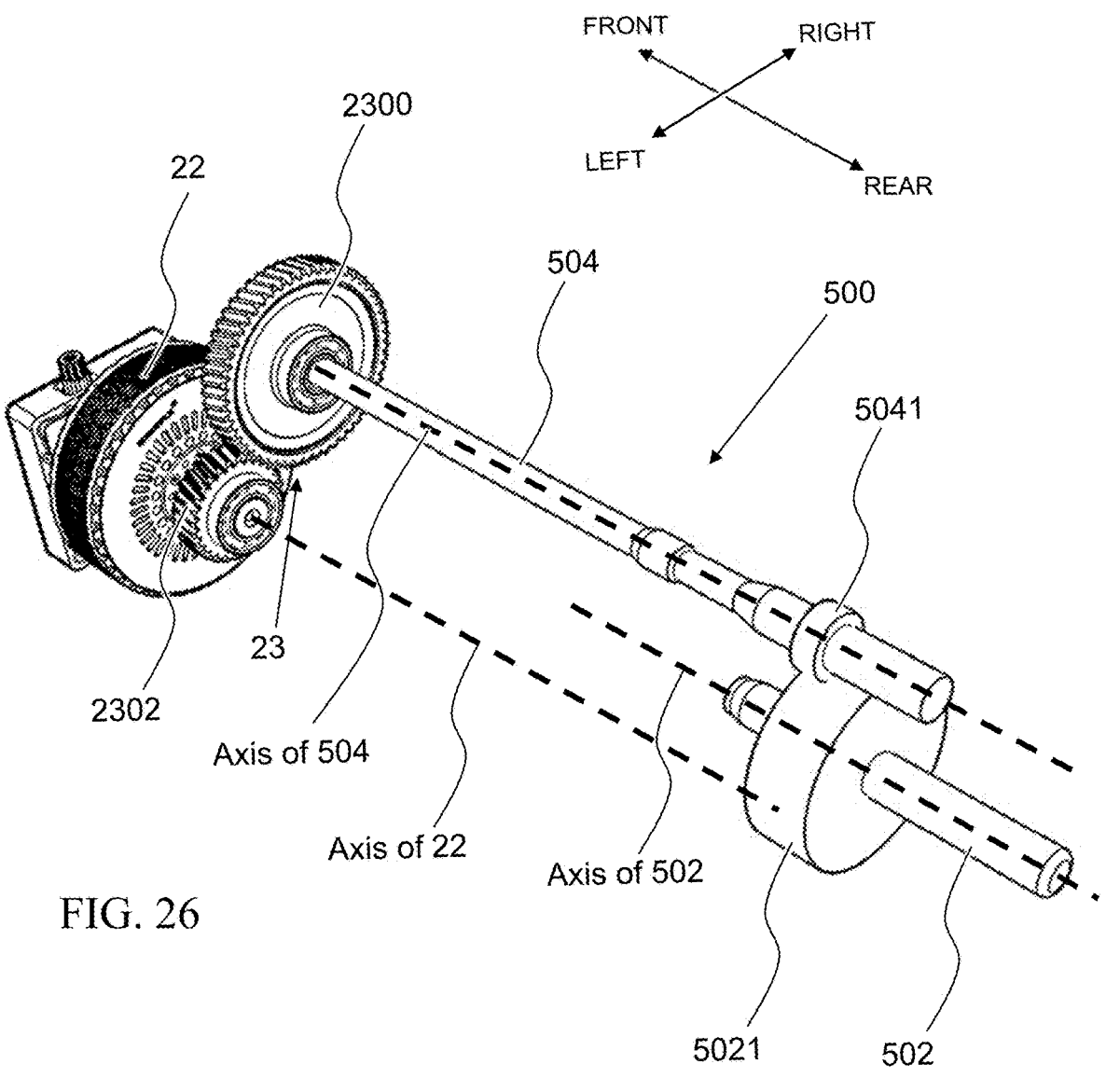
FIG. 26 shows a rear perspective view of a PTO assembly according to a preferred embodiment of the present invention.
Figure 27:
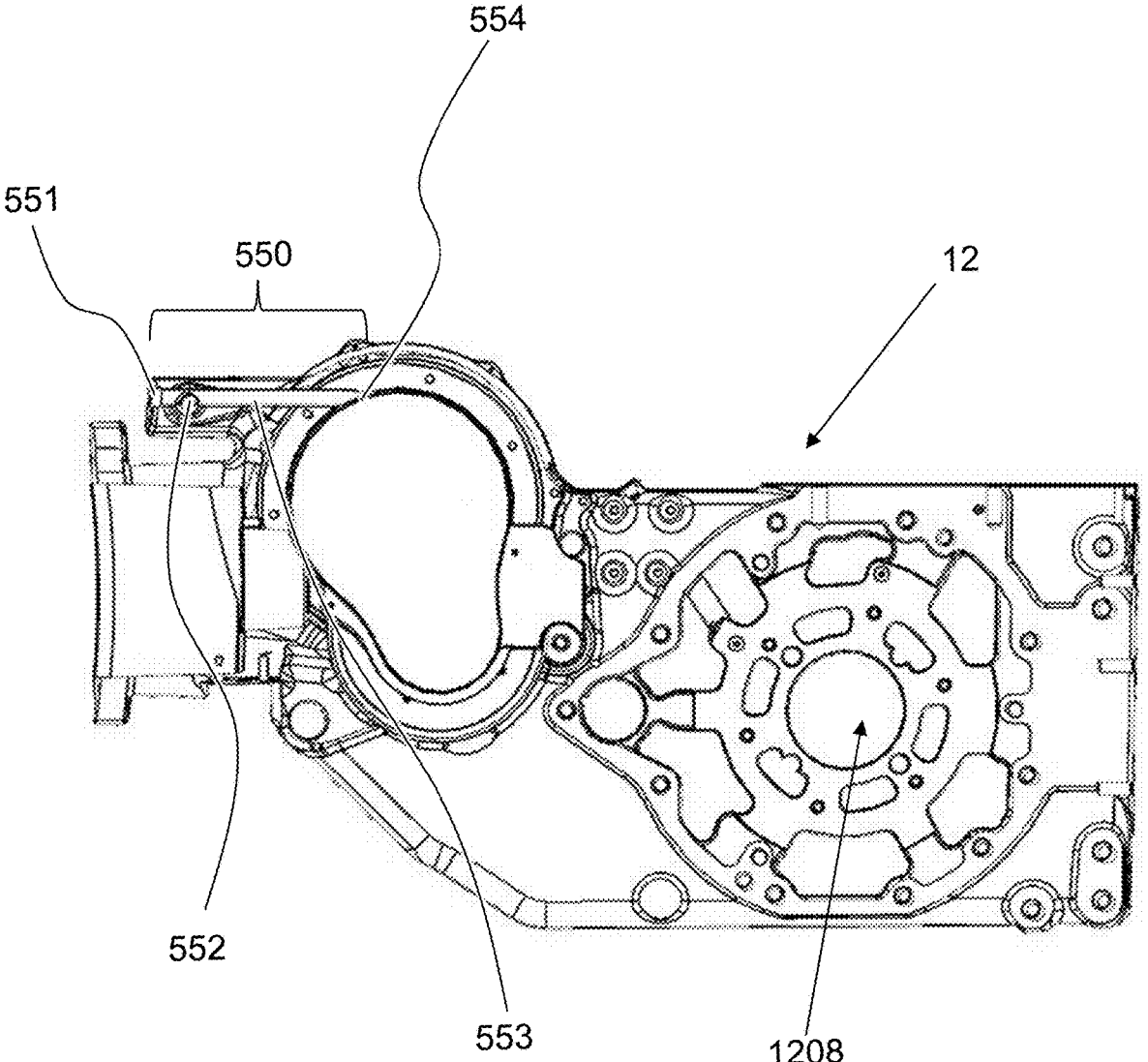
FIG. 27 shows a cross sectional side view of a rear frame of an electric work vehicle according to a preferred embodiment of the present invention.
Figure 28:
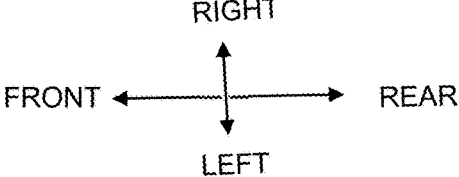
FIG. 28 shows a cross sectional top view of a rear frame of an electric work vehicle according to a preferred embodiment of the present invention.
Figure 29:
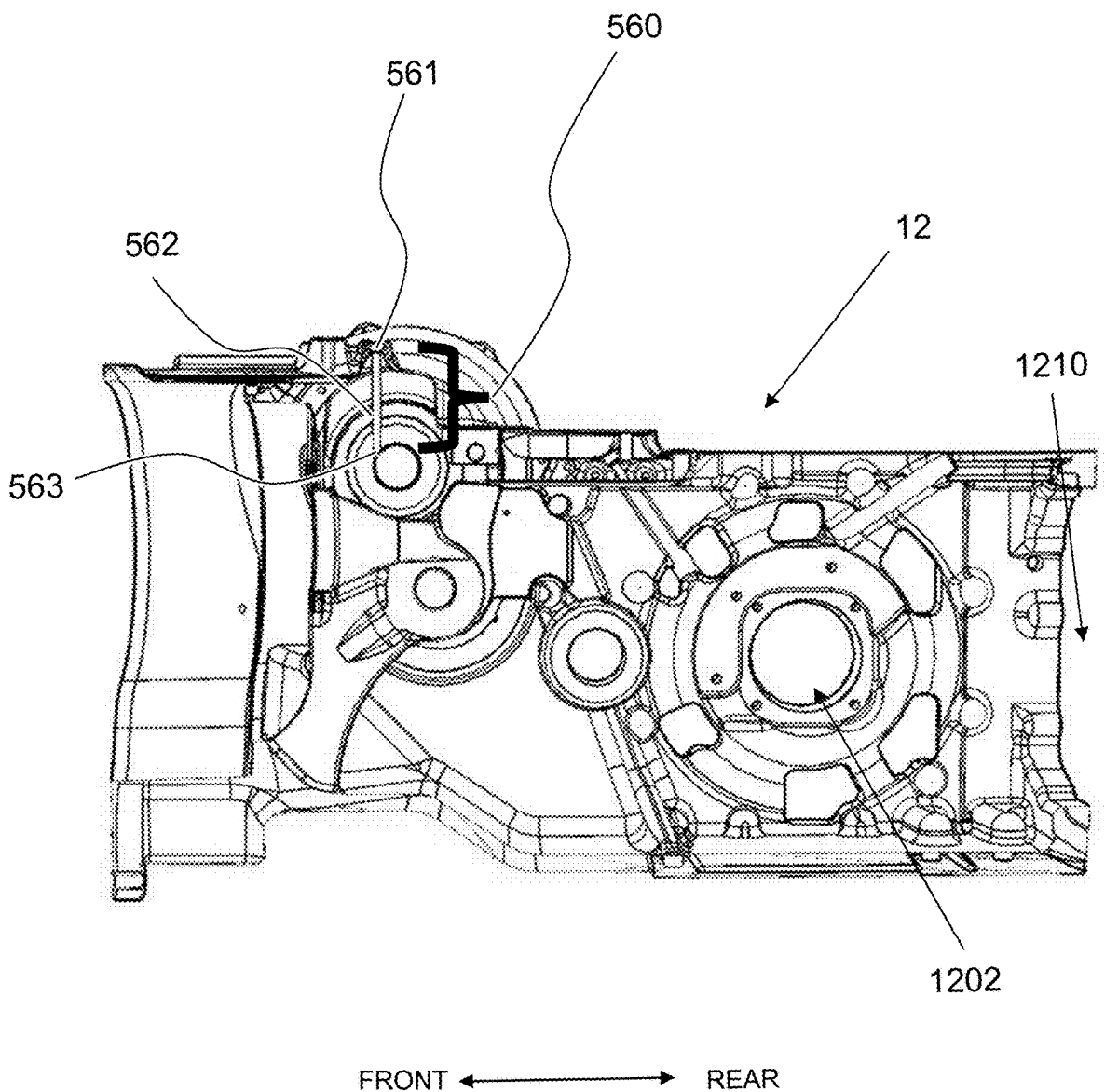
FIG. 29 shows a cross sectional side view of a rear frame of an electric work vehicle according to a preferred embodiment of the present invention.

As shown in FIGS. 25 and 26, the PTO 500 preferably includes a PTO input shaft 504 which is fixed to the PTO input shaft gear 2300. The PTO input shaft 504 extends in a front-back direction of the electric work vehicle and engages with a PTO output shaft 502 which is supported by a PTO housing 508. The PTO input shaft 504 preferably includes a rotation transferring portion 5041 which engages with a rotation transferring portion 5021 of the PTO output shaft 502. The rotation transferring portions 5021 and 5041 are preferably gear-shaped portions (the gear teeth of the rotation transferring portions 5021 and 5041 are omitted from FIGS. 25 and 26 for the sake of simplicity), The PTO output shaft 502 is structured to be able to engage with and operate standard PTO agricultural accessories. The PTO housing 508 is preferably connected to a rear end of the gear casing 1200, with a PTO opening 1210 being defined in the gear casing 1200 to permit the PTO input shaft 504 to extend from the PTO input shaft gear 2300 to an outside of the gear casing 1200, as shown in FIG. 17B. The PTO housing 508 is preferably supported by the rear end of the gear casing 1200 and PTO supporting brackets 506 provided on left and right sides of the electrical vehicle, as shown in FIG. 9. The PTO supporting brackets 506 preferably contact both a portion of the PTO housing 508 and portions of respective ones of the left hub and casing 4L2 and the right hub and casing 4R2.

Components of the third gearing 19, the fourth gearing 21, the fifth gearing 23, and the sixth gearing 25 will now de described with reference to FIGS. 9-13A, which show different views of portions of a rear of a partially disassembled electric work vehicle according to a preferred embodiment of the present invention. The third gearing 19 preferably includes a left motor driven pinion gear 542L, a left motor transmission gear 544L, a left driving ratio gear 546L, and a left wheel driving gear 4L3. Similarly, the fourth gearing 21 preferably includes a right motor driven pinion gear 542R, a right motor transmission gear 544R, a right driving ratio gear 546R, and a right wheel driving gear 4R3.

The left motor driven pinion gear 542L and the right motor driven pinion gear 542R are preferably directly connected to rotating shafts of the third electric motor 18 and the fourth electric motor 20, respectively. The left motor driven pinion gear 542L includes different diameter portions including low speed gear teeth 5420L and high speed gear teeth 5422L which are provided on two ends of, and selectively engageable by, a dog clutch through a dog ring 5362 which is controlled by a shift fork 536 (discussed in detail later). Similarly, the right motor driven pinion gear 542R includes different diameter portions including low speed gear teeth 5420R and high speed gear teeth 5422R which are provided on two ends of dog rings 5362L and 5362R controlled by respective shift forks 536L and 536R.

The left motor transmission gear 544L and the right motor transmission gear 544R are arranged to respectively engage with the left motor driven pinion gear 542L and the right motor driven pinion gear 542R. Specifically, as shown in FIG. 12, for example, the left motor transmission gear 544L preferably includes different diameter portions with low speed gear teeth 5440L which engage with the low speed gear teeth 5420L, high speed gear teeth 5442L which engage with the high speed gear teeth 5422L, and driving teeth 5444L which engage with the left driving ratio gear 546L. Similarly, the right motor transmission gear 544R preferably includes different diameter portions with low speed gear teeth 5440R which engage with the low speed gear teeth 5420R, high speed gear teeth 5442R which engage with the high speed gear teeth 5422R, and driving teeth 5444R which engage with the right driving ratio gear 546R.

The left driving ratio gear 546L and the right driving ratio gear 546R are arranged to respectively engage with the left wheel driving gear 4L3 and the right wheel driving gear 4R3. Specifically, the left driving ratio gear 546L includes different diameter portions with input teeth 5460L which engage with the driving teeth 5444L and output teeth 5462L which engage with the left wheel driving gear 4L3. Similarly, the right driving ratio gear 546R includes different diameter portions with input teeth 5460R which engage with the driving teeth 5444R and output teeth 5462R which engage with the right wheel driving gear 4R3.

The left wheel driving gear 4L3 and the right wheel driving gear 4R3 are preferably located such that their central axes are between (i) the third electric motor 18 and the fourth electric motor 20 and (ii) the sixth electric motor 24 in the up-down direction of the electric work vehicle. A laterally outermost portion of the third gearing 19 is located inward from the third electric motor 18 in the left-right direction of the electric work vehicle, and a laterally outermost portion of the fourth gearing 21 is located inward from the fourth electric motor 20 in the left-right direction of the electric work vehicle. At least highest portions of the third gearing 19 and the fourth gearing 21 are preferably located above an axis of the fifth electric motor 22, or the central axis of the fifth electric motor 22, in the up-down direction of the electric work vehicle. Preferably all portions of the third gearing 19, the fourth gearing 21, the fifth gearing 23, and the sixth gearing 25 are located between the third electric motor 18 and the fourth electric motor 20 in the left-right direction of the electric work vehicle.

The electric work vehicle according to a preferred embodiment of the present invention preferably includes a parking assembly (e.g., a locking assembly) 520 which is structured to keep the electric work vehicle stationary when it is not being actively driven by a user, as shown in FIGS. 10, 11, and 22-24. The parking assembly 520 preferably includes a parking shaft 522 which is able to be actuated in the left-right direction of the electric work vehicle to engage left and right parking pawls 524L and 524R. The left and right parking pawls 524L and 524R are able to contact portions of the third gearing 19 and the fourth gearing 21 to thereby fix the rotational positions of the third gearing 19 and the fourth gearing 21 such that the third electric motor 18 and the fourth electric motor 20 are not able to drive the left rear wheel 4L and the right rear wheel 4R. Further, when the left and right parking pawls 524L and 524R fix the rotational positions of the third gearing 19 and the fourth gearing 21, the wheels of the electric work vehicle are prevented from rotating in response to externally applied forces (e.g., a slope or incline of the ground on which the electric work vehicle may be located, pushing/pulling force applied by another vehicle, pushing/pulling force applied by humans or animals, etc.).

The left and right parking pawls 524L and 524R are preferably rotationally supported by left and right parking pawl rotary supports 5240L and 5240R which allow the left and right parking pawls 524L and 524R to be selectively tilted towards and away from the left motor transmission gear 544L and the right motor transmission gear 544R in response to lateral movement by the parking shaft 522. The parking pawls 524L and 524R are preferably provide a biasing force which acts on the left and right parking pawls 524L and 524R to pull them away from the left motor transmission gear 544L and the right motor transmission gear 544R. The parking shaft 522 is preferably biased, for example, in the right direction by bias springs 526, and includes two actuating protrusions 5220 and a flange 5222. The actuating protrusions 5220 are respectively provided one for each of the left and right parking pawls 524L and 524R. The actuating protrusions 5220 include angled engaging surfaces which press the parking pawls 524L and 524R to engage with an outermost gear of the left motor transmission gear 544L and an outermost gear of the right motor transmission gear 544R when the parking shaft 522 is moved, for example, in the right direction of the electric work vehicle. Accordingly, the equilibrium state of the parking assembly 520 is preferably a parked position with the left and right parking pawls 524L and 524R engaged with the left motor transmission gear 544L and the right motor transmission gear 544R. The left and right parking pawls 524L and 524R are preferably structured to engage with and lock the low speed gear teeth 5440L and 5440R of the left motor transmission gear 544L and the right motor transmission gear 544R simultaneously.

Figure 23:
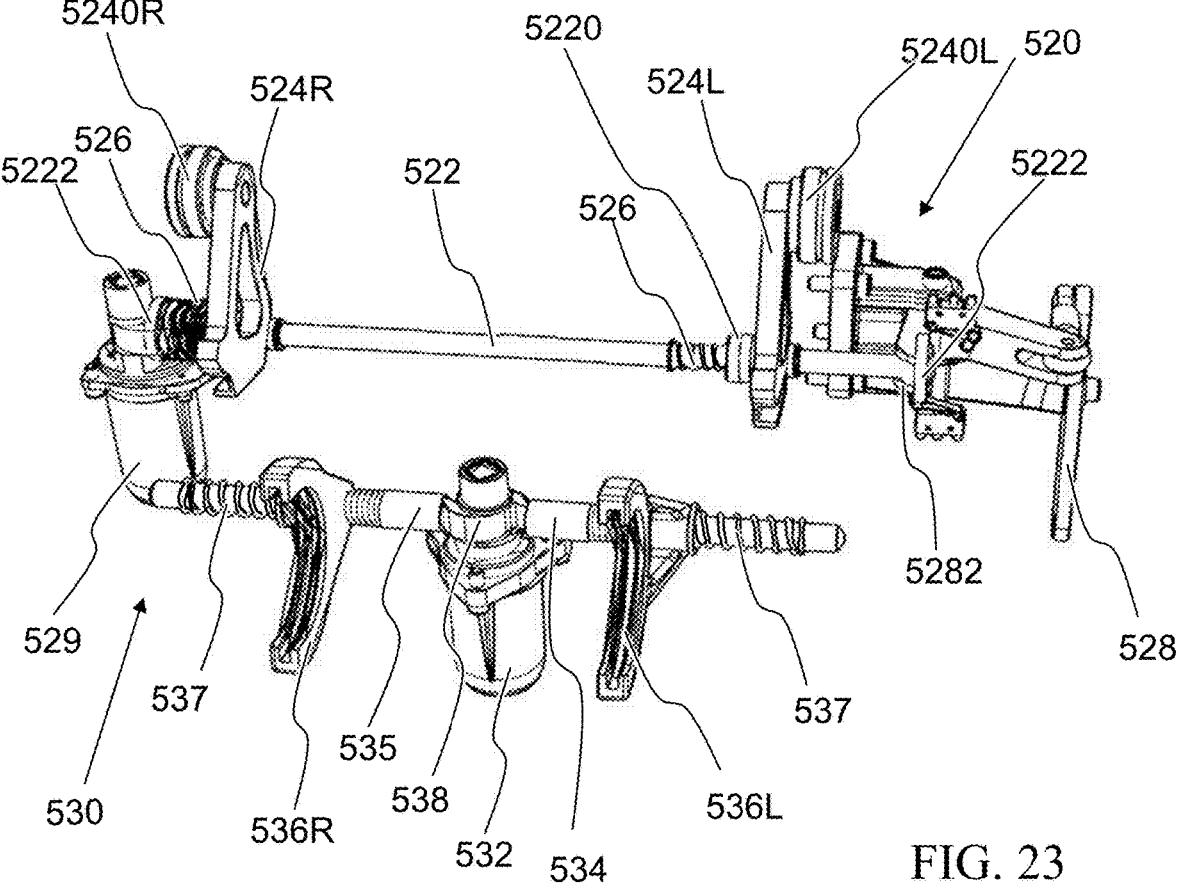
FIG. 23 shows a front perspective view of components of a parking assembly and a gear shifting assembly according to a preferred embodiment of the present invention.

The parking shaft 522 preferably includes flanges 5222 provided on each terminating end of the parking shaft 522, as shown in FIG. 23, for example. One of the flanges 5222, which may extend to a location outside of the rear housing 12 due to the parking shaft 522 extending though a parking shaft opening 1211 in the rear housing 12, is arranged to be engaged by a linkage 528 through a pulling fork 5282. The linkage 528 is connected to a parking lever 5284 (shown in FIGS. 1D, 1F, and 1H) which is able to be manually actuated by the driver of the electric work vehicle to pull on the parking shaft 522 through the engagement between the flange 5222 and the pulling fork 5282. Accordingly, the driver of the electric work vehicle is able to engage and disengage the parking assembly 520 manually through the actuation of the linkage 528. The other of the flanges 5222 is arranged to be engaged by a parking actuator 529 which is affixed to a parking actuator retaining portion 1204 defined in the rear housing 12. The parking actuator 529 is shown, for example, in FIG. 23.

The parking actuator 529 preferably includes a motor (e.g., a servo motor, a stepper motor, etc.) and a rotating cam affixed to an output shaft of the motor, and can be controlled by a controller (e.g., a CPU, a vehicle ECU, a driving controller, etc.). The output shaft of the parking actuator 529 preferably intersects an extending direction of the parking shaft 522. The parking actuator 529 is preferably located inward of the third electric motor 18 and the fourth electric motor 20 in the left-right direction of the electric work vehicle and is provided on an opposite side of the electric work vehicle from the linkage 528 in the left-right direction of the electric work vehicle, as shown in FIG. 9, for example. More specifically, the parking actuator 529 is preferably located on a left side of the rear housing 12 and the parking shaft 522 while the linkage 528 is provided on a right side of the rear housing 12 and the parking shaft 522. The rotating cam is structured to press on or release pressure from the flange 5222 to thereby actuate the parking shaft 522 in the left-right direction of the electric work vehicle. The operation of the parking actuator 529 may be controlled by a driving computer configured or programmed to control the motor, by a button on a dashboard of the electric work vehicle, and by any other desirable manner. Thus, the engagement and disengagement of the parking assembly 520 may be performed using either or both of the linkage 528 and the parking actuator 529. Further, the operation of the parking actuator 529 may be performed without affecting the positioning of the linkage 528 and the parking lever 5284. With the structures of preferred embodiments of the present invention, it is possible to lock rotation of both the left rear wheel 4L and the right rear wheel 4R by actuating the single parking shaft 522.

In accordance with a preferred embodiment of the present invention, the third gearing 19 and the fourth gearing 21 each preferably include/define both of a high gear transmission path and a lower gear transmission path which may be selectively engaged through the use of a gear shifting assembly 530, as shown in FIGS. 10, 11, and 22-24. The high gear transmission paths are respectively defined by the high speed gear teeth 5422L and 5442L and the high speed gear teeth 5422R and 5442R. The low gear transmission paths are respectively defined by the low speed gear teeth 5420L and 5440L and the low speed gear teeth 5420R and 5440R.

The gear shifting assembly 530 preferably includes a shifting actuator 532 which is able to be energized to produce pressing forces which move a first shift rod 534 and a second shift rod 535 in opposing vectors within the left-right direction of the electric work vehicle. The first shift rod 534 and the second shift rod 535 are connected to respective shift forks 536 which engage with the dog rings 5362 of the left motor driven pinion gear 542L and the right motor driven pinion gear 542R. When the shift forks 536 are moved laterally outward in the left-right direction of the electric work vehicle, the low speed gear teeth 5420L and 5420R are engaged to be rotated by the third electric motor 18 and the fourth electric motor 20. When the shift forks 536 are moved laterally inward in the left-right direction of the electric work vehicle, the high speed gear teeth 5422L and 5422R are engaged to be rotated by the third electric motor 18 and the fourth electric motor 20.

Figure 24:
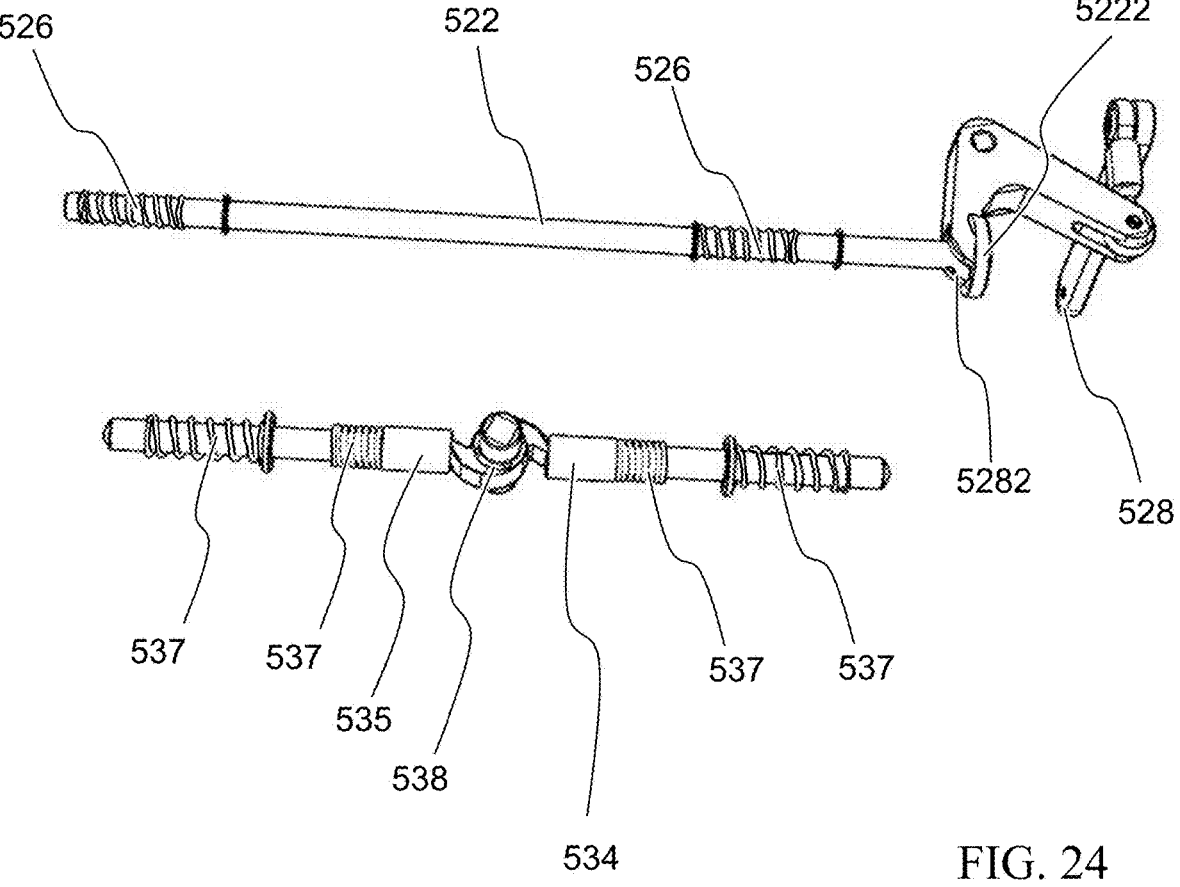
FIG. 24 shows a top perspective view of components of a parking assembly and a gear shifting assembly according to a preferred embodiment of the present invention.

The first shift rod 534 and a second shift rod 535 are preferably biased inward towards a center of the electric work vehicle in the left-right direction of the electric work vehicle by shift rod biasing springs 537. The shifting actuator 532 is preferably mounted to a gear actuator retaining portion 1206 of the rear housing 12 such that a portion of the shifting actuator 532 is located outside of the rear housing 12. The shifting actuator 532 preferably includes a shifting cam 538 which moves from a first cam position to a second cam position to applies the pressing forces that move the first shift rod 534 and the second shift rod 535. As shown in FIGS. 23 and 24, the shifting cam 538 preferably has point symmetry about a rotational axis of the shifting cam 538. More specifically, the shifting cam 538 may be an S-shaped cam. The shifting actuator 532 is preferably arranged to rotate the shifting cam 538 between the first cam position and the second cam position to change between high range and low range gearing. The first shift rod 534 and second shift rod 535 are preferably inwardly biased into the shifting cam 538. The first cam position causes the high speed gear teeth 5422L and 5422R to be engaged to be rotated by the third electric motor 18 and the fourth electric motor 20 while the second cam position causes the low speed gear teeth 5420L and 5420R to be engaged to be rotated by the third electric motor 18 and the fourth electric motor 20. Position sensors and/or encoders are preferably provided for ends of the first shift rod 534 and the second shift rod 535 and the shifting actuator 532 to determine when the shifting actuator 532 has pushed the first shift rod 534 and the second shift rod 535 far enough to reach the second cam position to thereby engage the low gears.

Figure 21A:
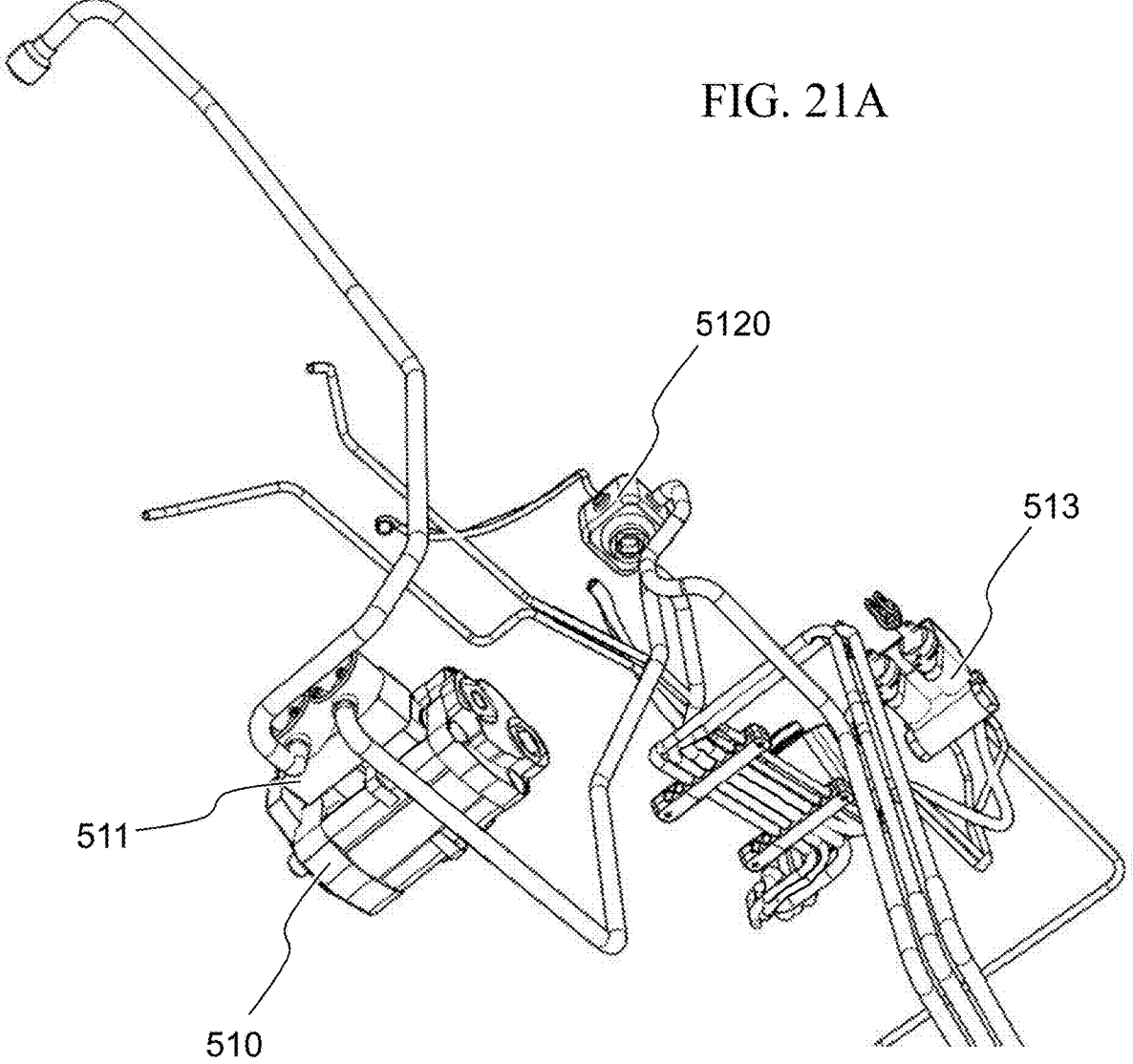
FIG. 21A shows a bottom perspective view of a hydraulic assembly according to a preferred embodiment of the present invention.
Figure 21B:
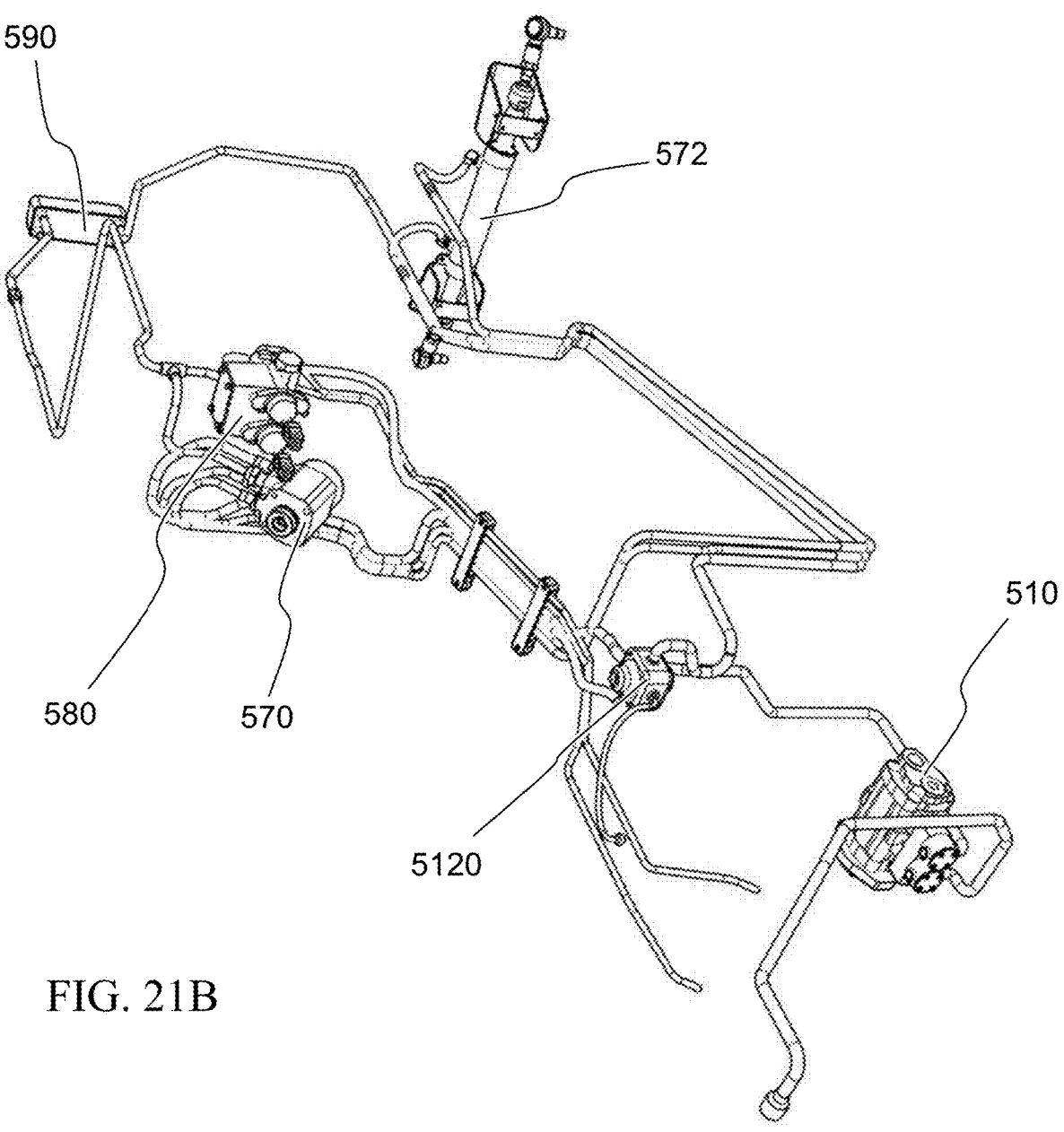
FIG. 21B shows an upper left side perspective view of a hydraulic assembly according to a preferred embodiment of the present invention.
Figure 22:
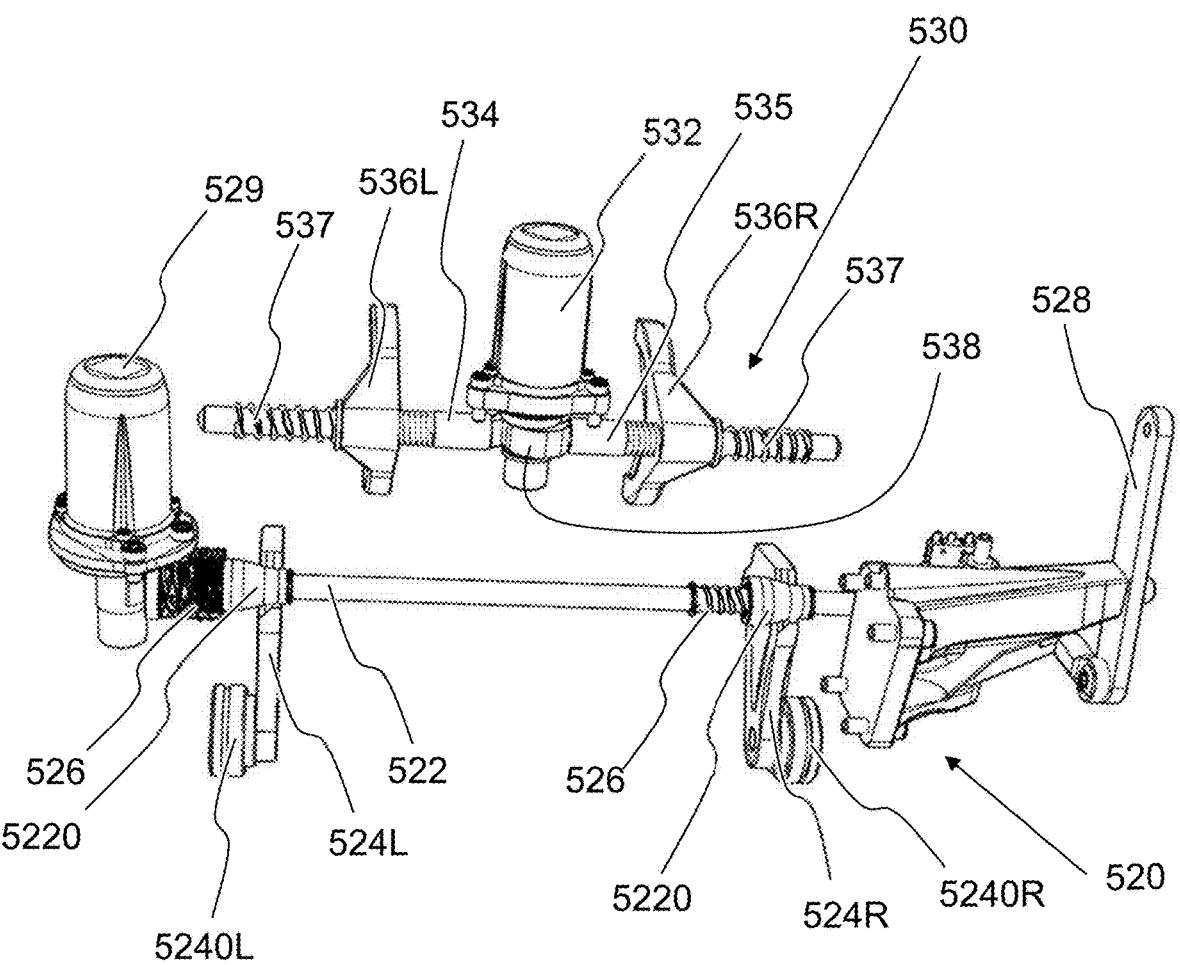
FIG. 22 shows a rear perspective view of components of a parking assembly and a gear shifting assembly according to a preferred embodiment of the present invention.

FIGS. 21A and 21B shows a preferred embodiment of a hydraulic assembly of an electric work vehicle according to a preferred embodiment of the present invention. Control lever(s) 509 and linkage 599 to control the hydraulic assembly is preferably located to a right side of the electric work vehicle, as shown in FIGS. 1B, 1D, and 1H. The hydraulic assembly preferably includes a hydraulic pump 510 which is driven by the sixth electric motor 24 through a hydraulic motor driven gear 518 which meshes with a hydraulic pump input gear 516 of the hydraulic pump 510. The hydraulic pump 510 is preferably affixed to a lower surface of the rear housing 12, as shown in FIG. 8, for example. The hydraulic pump 510 is preferably connected to a hydraulic pump coupling 511 which is connected to hydraulic lines (unlabeled) of the electric work vehicle. The hydraulic lines connect the hydraulic pump 510 to a hydraulic filter 512, as shown in FIG. 13A. The hydraulic filter 512 preferably includes a filter base 5120 which is further connected to a collection tube 519 which is structured to collect lubricating oil/hydraulic fluid from an inside of the rear housing 12. The filter base 5120 is preferably connected to the hydraulic pump 510 through a hydraulic connection tube 514, as shown in FIGS. 7, 8, and 13A.

Further, in a preferred embodiment of the present invention, a power steering controller 570, a brake master cylinder 580, and a heat exchanger 590 are also connected to the hydraulic lines of the hydraulic assembly, as shown in FIG. 21B, for example. The power steering controller is preferably electrically connected to a control computer of the electric work vehicle, or is mechanically operated in response to a driver's operating of a steering wheel. The power steering controller 570 is connected to and controls a steering cylinder 572 which is able to turn the left front wheel 2L and the right front wheel 2R. The heat exchanger 590 is structured to remove heat from the lubricating oil/hydraulic fluid which travels through the hydraulic assembly.

FIG. 25 shows a cross sectional view of components located/retained within a rear housing 12 of an electric work vehicle according to a preferred embodiment of the present invention. The PTO input shaft 504 preferably extends between the gears of the third gearing 19 and the fourth gearing 21 in the left-right direction of the electric work vehicle. Further, the PTO input shaft 504 is preferably located above central axes of the left motor driven pinion gear 542L and the left motor driven pinion gear 542R in the up-down direction of the electric work vehicle. FIG. 26 shows that a PTO motor gear 2302 is preferably located below the PTO input shaft 504 and the PTO input shaft gear 2300 of the PTO input shaft 504 in the up-down direction of the electric work vehicle. A diameter of the PTO input shaft gear 2300 is preferably smaller than a diameter of the fifth electric motor 22. The axis of the fifth electric motor 22 is preferably offset from an axis of the PTO input shaft 504 in the left-right direction of the electric work vehicle when the electric work vehicle is viewed from above. Further, and axis of the PTO output shaft 502 is preferably located below the axis of the PTO input shaft 504 in the up-down direction of the electric work vehicle.

In a preferred embodiment of the present invention, the rear housing 12 preferably contains lubrication oil which, when at rest, includes an oil upper surface. The collection tube 519 and the hydraulic filter 512 are located under the oil upper surface in the up-down direction of the electric work vehicle, as shown in FIGS. 13A and 25, for example. Specifically, the oil upper surface is preferably located at or above a lower portion of the PTO motor gear 2302 and at or below a lower portion of the PTO input shaft 504 in the up-down direction of the electric work vehicle. In other preferred embodiments of the present invention, the oil upper surface is at least as high as the axis of the PTO output shaft 502 in the up-down direction of the electric work vehicle. The lubrication oil could be, for example, gear oil, transmission fluid, hydraulic oil, etc. The PTO motor gear 2302 is preferably located below the upper surface of the oil, and/or below the PTO output shaft 502, in the up-down direction of the electric work vehicle. With this arrangement, at least two of the third gearing through the sixth gearing 19, 21, 23, and 25 include gear teeth which rotate under the upper surface of the oil to provide lubrication for gears of the third gearing through the sixth gearing 19, 21, 23, and 25.

A preferred embodiment of a rear housing 12 of an electric work vehicle corresponding to the present invention is shown in FIGS. 14-20. The rear housing 12 preferably has a T-shape when viewed from above. The T-shape is preferably asymmetrical in a left-right direction of the electric work vehicle. An upper portion of the rear housing 12 preferably includes a depression portion in which the gear actuator retaining portion 1206 is defined. The gear actuator retaining portion 1206 is structured to support the shifting actuator 532.

In a preferred embodiment of the present invention, the first motor housing portion 12-1 preferably includes a motor shaft passage 12-15 which permits a shaft of the third electric motor 18 to pass into a central portion of the rear housing 12, and a gear shaft support 12-17 which supports the left motor driven pinion gear 542L. As shown in FIG. 17A, the second motor housing portion 12-2 preferably includes a motor shaft passage 12-25 which permits a shaft of the fourth electric motor 20 to pass into the central portion of the rear housing 12, and a gear shaft support 12-27 which supports the right motor driven pinion gear 542R.

The third motor housing portion 12-3 preferably includes a motor shaft passage 12-35 which permits a shaft of the fifth electric motor 22 to pass into the central portion of the rear housing 12 and a PTO input shaft support 12-37 which supports the PTO input shaft gear 2300 and the PTO input shaft 504. The fourth motor housing portion 12-4 preferably includes a motor shaft passage 12-45 which permits a shaft of the sixth electric motor 24 to pass into the central portion of the rear housing 12 and a pump support 12-47 which supports the hydraulic pump 510.

Figure 14:
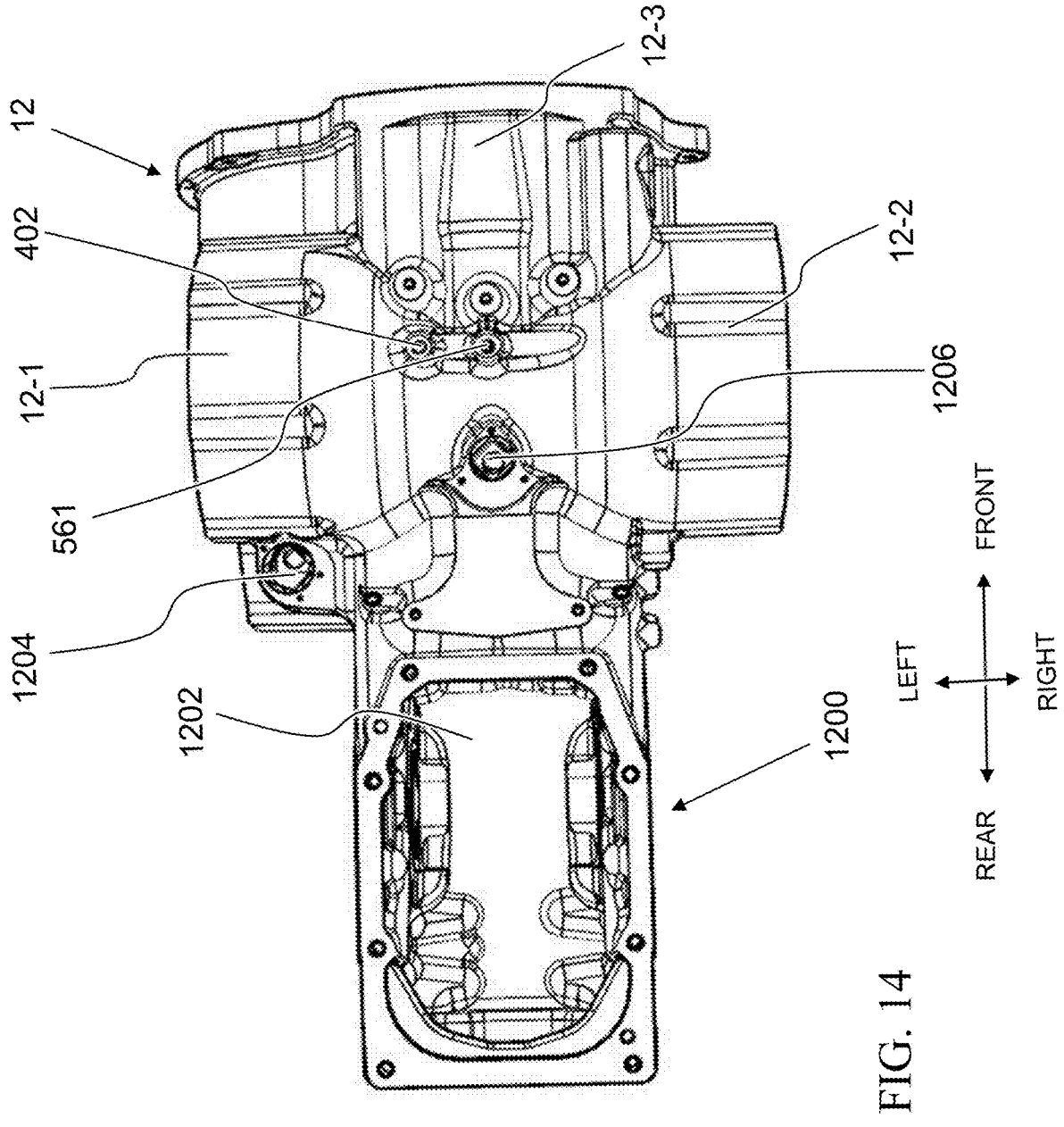
FIG. 14 shows a top view of a rear frame according to a preferred embodiment of the present invention.
Figure 15:
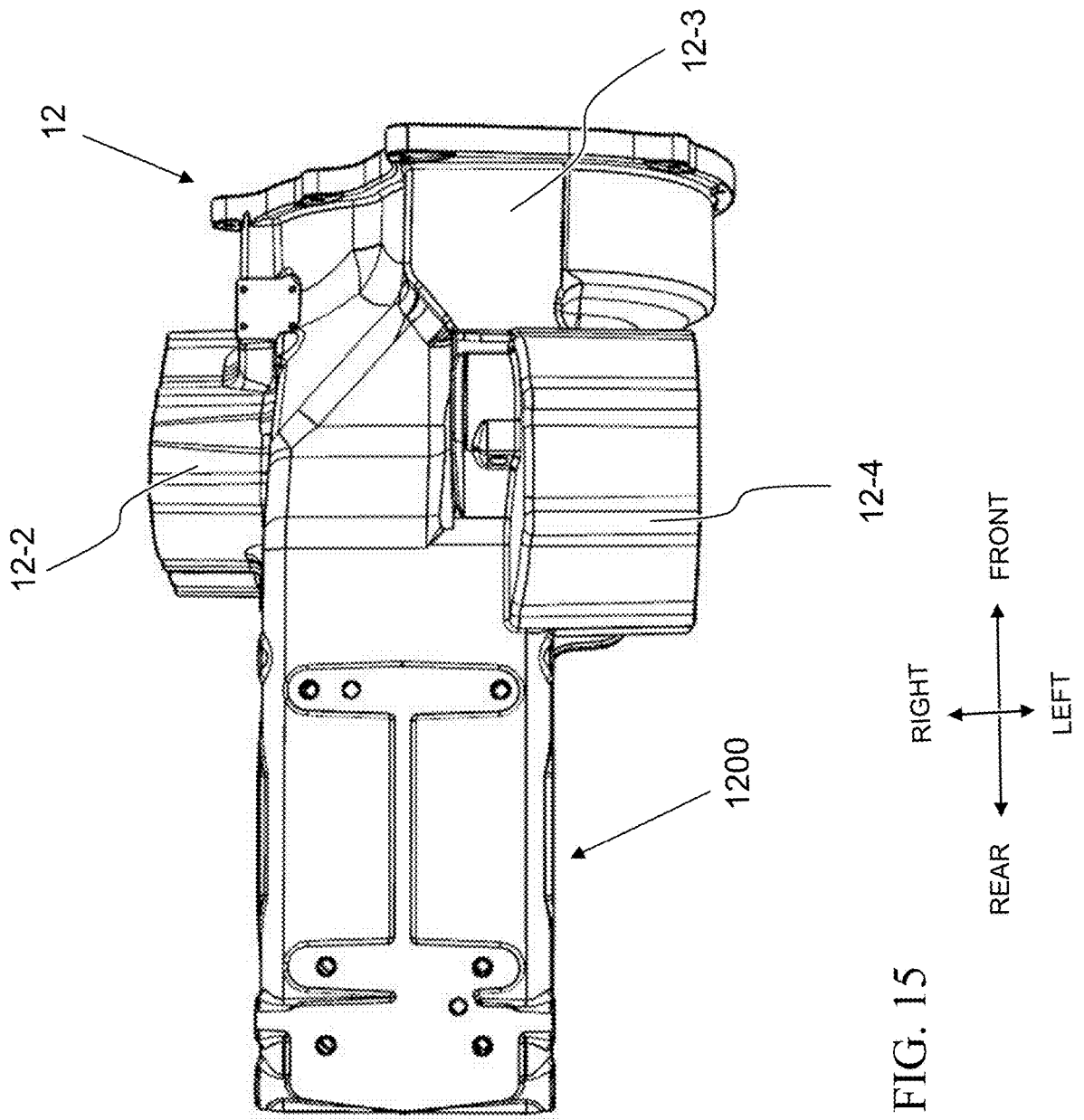
FIG. 15 shows a bottom view of a rear frame according to a preferred embodiment of the present invention.
Figure 16:
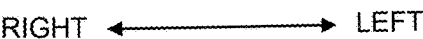
FIG. 16 shows a front view of a rear frame according to a preferred embodiment of the present invention.

As shown in FIG. 14, for example, a portion of an upper surface of the rear frame adjacent to the fourth motor housing portion 12-4 preferably includes a parking actuator retaining portion 1204 which is structured to support the parking actuator 529. A rear portion of the rear housing 12 preferably defines a gear casing 1200 which houses the third gearing 19 and the fourth gearing 21. An upper portion of the gear casing 1200 preferably includes a gear access opening 1202 and a rear portion of the gear casing 1200 preferably includes the PTO opening 1210.

In a preferred embodiment of the present invention, the rear housing 12 preferably includes at least a first oil path 550 and a second oil path 560 which pass through the rear housing 12 to permit oil to be circulated back into the rear housing 12 through, for example, hydraulic/oil lines. As shown in FIGS. 14, 16, 17A, 27, and 28, the first oil path 550 is preferably provided on a right side of the rear housing 12 adjacent to the second motor housing portion 12-2. The first oil path 550 preferably includes a front inlet opening 551, a side inlet opening 552, a first channel 553, and a first outlet opening 554. The front inlet opening 551 is preferably defined in a front surface of the rear housing 12 between the second motor housing portion 12-2 and the third motor housing portion 12-3. The side inlet opening 552 is preferably defined is a right side surface of the rear housing 12 adjacent to the second motor housing portion 12-2. The first channel 553 preferably extends horizontally in the front-rear direction of the electrical vehicle.

The front inlet opening 551 and the side inlet opening 552 preferably extend in perpendicular directions and are connected to a first channel 553 which extends in a front-rear direction of the electrical vehicle. The front inlet opening 551 is preferably connected to an oil return from the brake master cylinder 580 while the side inlet opening 552 is preferably connected to a main oil return line. The first outlet opening 554 is preferably provided at a rear end of the first channel 553 and deposits the oil into a central reservoir of the rear housing 12. The first outlet opening 554 is preferably located above the right motor driven pinion gear 542R, and most preferably is structured to drop oil onto the low speed gear teeth 5420R.

The second oil path 560 preferably includes a top inlet opening 561, a second channel 562, and a second outlet 563, as shown in FIGS. 14 and 28-31, for example. The second oil path 560 preferably lubricates third and fourth shafts 1802 and 2002 of the third electric motor 18 and the fourth electric motor 20 which are connected to the left and right motor driven pinion gears 542L and 542R. The third and fourth shafts 1802 and 2002 are preferably at least partially hollow. The top inlet opening 561 is preferably provided on a central portion of an upper surface of the rear housing 12 and is connected to a low pressure oil supply. The second channel 562 preferably extends vertically downward from the top inlet opening 561 to a central portion of the rear housing 12. The second outlet 563 is provided at an axial bottom of the second channel 562 and directs the oil input into the top inlet opening 561 to components within the rear housing 12.

As shown in FIGS. 14, 16, 17A, and 27-31, the front inlet opening 551, the side inlet opening 552, and the top inlet opening 561 are preferably located forward of the third and fourth shafts 1802 and 2002 of the third electric motor 18 and the fourth electric motor 20 in the front-rear direction of the electric work vehicle. Further, the oil output from the first oil path 550 is preferably introduced above the fourth shaft 2002 and oil output from the second oil path 560 is preferably introduced to a location inside of or between the third and fourth shafts 1802 and 2002, as shown in FIG. 31.

Figure 30:
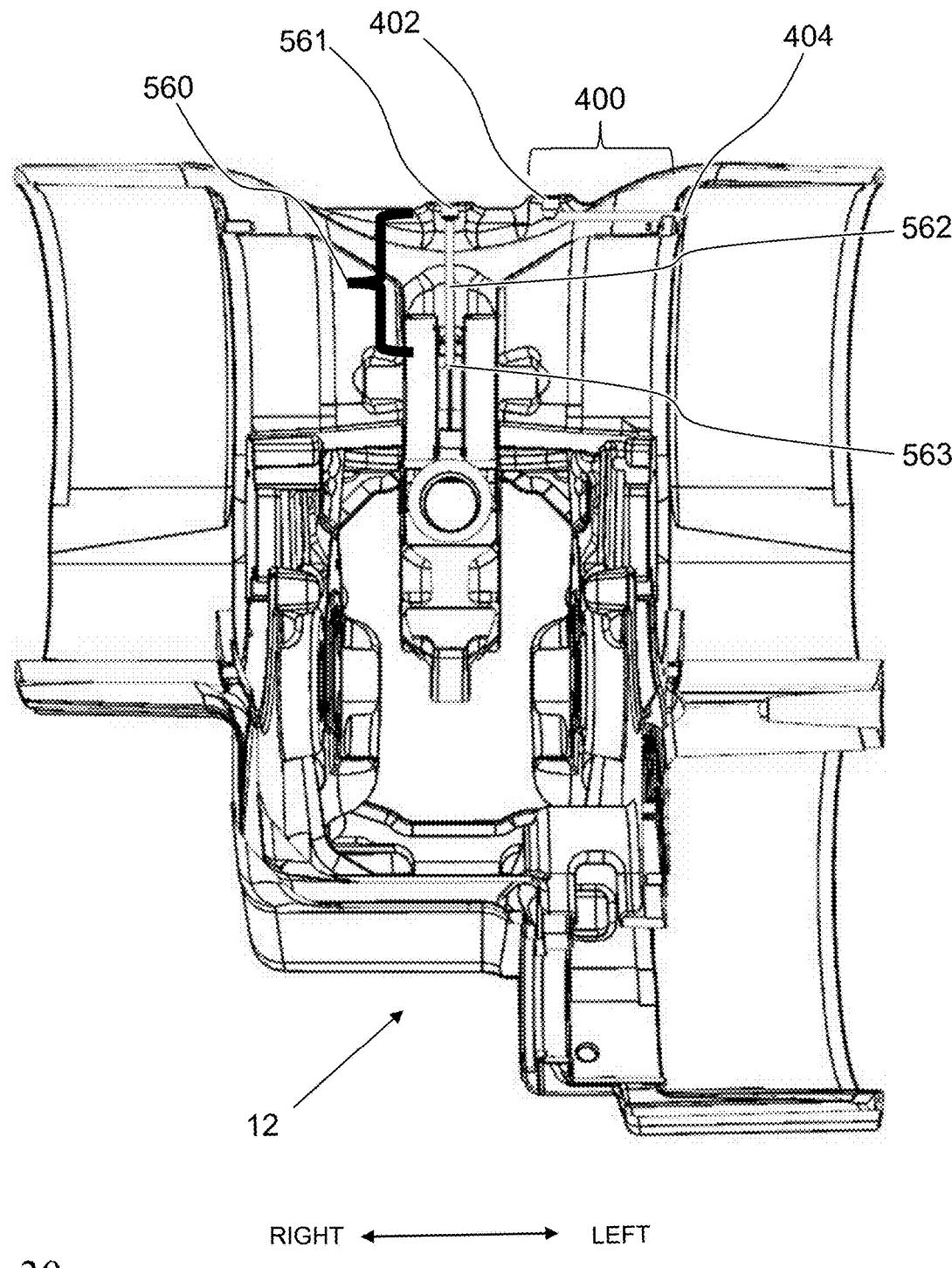
FIG. 30 shows a cross sectional front view of a rear frame of an electric work vehicle according to a preferred embodiment of the present invention.

As shown in FIGS. 30 and 31, the rear housing 12 preferably includes a tank breather 400 which allows air to exit from an inside of the rear housing 12 to an outside of the rear housing 12. The tank breather 400 preferably includes a first opening 402 and a second opening 404. The first opening 402 preferably opens upwards out of an upper surface of the rear housing 12. The second opening 404 preferably opens inwards into an inner portion of the rear housing 12, to permit air to flow from the inside of the rear housing 12 into the second opening 404 and then out of the first opening 402. The tank breather 400 is preferably located on an opposite side of the rear housing 12 with respect to the first oil path 550 in the left-right direction of the electric work vehicle.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An electric work vehicle comprising:

a rear housing;

a first motor to drive a first rear wheel, the first motor being supported by the rear housing;

a second motor to drive a second rear wheel, the second motor being supported by the rear housing;

a locking assembly;

a third motor to drive a first electric work vehicle component other than a wheel, the third motor being supported by the rear housing; and a fourth motor to drive a second electric work vehicle component other than a wheel, the fourth motor being supported by the rear housing; wherein the first motor is connected to a first gearing to drive the first rear wheel;

the second motor is connected to a second gearing to drive the second rear wheel;

the first gearing and the second gearing are operable to rotate independently of each other;

the locking assembly is configured to simultaneously lock both of the first gearing and the second gearing from being able to rotate;

at least a portion of the first gearing and at least a portion of the second gearing are located above the third motor in an up-down direction of the vehicle;

the third motor is supported by the rear housing at a position between the first motor and the second motor; and an axis of the fourth motor extends in parallel or substantially in parallel with an axis of the first motor and an axis of the second motor.

2. The electric work vehicle according to claim 1, further comprising:

a linkage is connected to the locking assembly and operable to control the locking assembly to lock and unlock the first gearing and the second gearing.

3. The electric work vehicle according to claim 1, wherein the first gearing includes a first plurality of gears; the second gearing includes a second plurality of gears; the locking assembly is operable to engage with an outermost gear of the first plurality of gears in a left-right direction of the electric work vehicle and an outermost gear of the second plurality of gears in the left-right direction of the electric work vehicle to simultaneously lock both of the first gearing and the second gearing.

4. The electric work vehicle according to claim 1, wherein the first gearing includes a first plurality of gears; the second gearing includes a second plurality of gears; and the locking assembly is operable to simultaneously lock a low gear of the first plurality of gears and a low gear of the second plurality of gears.

5. The electric work vehicle according to claim 1, wherein the first electric work vehicle component includes a Power Take-Off (PTO); and the second electric work vehicle component includes a hydraulic system.

6. The electric work vehicle according to claim 1, wherein an axis of the third motor extends perpendicular or substantially perpendicular to an axis of the first motor and an axis of the second motor; and an axis of the third motor is lower than an axis of the first motor and an axis of the second motor in an up-down direction of the electric work vehicle.

7. The electric work vehicle according to claim 1, wherein an axis of the fourth motor is lower than an axis of the first motor and an axis of the second motor in an up-down direction of the electric work vehicle; and an axis of the second motor is collinear with an axis of the first motor.

8. The electric work vehicle according to claim 1, wherein the third motor is located closer to one of the first motor or the second motor and farther from another one of the first motor or the second motor.

9. The electric work vehicle according to claim 1, wherein the third motor is larger than each of the first motor, the second motor, and the fourth motor.

10. The electric work vehicle according to claim 1, wherein an outermost portion of the first gearing is located to an inside of the first motor in a left-right direction of the vehicle; and an outermost portion of the second gearing is located to an inside of the second motor in the left-right direction of the electric work vehicle.

11. The electric work vehicle according to claim 10, further comprising: a gear casing affixed to a portion of the rear housing; wherein a portion of the first gearing and a portion of the second gearing are located within the gear casing.

12. The electric work vehicle according to claim 11, wherein a width of the gear casing in the left-right direction of the electric work vehicle is thinner than a width of the rear housing in the left-right direction of the electric work vehicle.

13. The electric work vehicle according to claim 11, wherein the first rear wheel and the second rear wheel are connected to respective rear wheel hubs which are mounted to the gear casing.

14. The electric work vehicle according to claim 11, wherein the first gearing and the second gearing each respectively include a plurality of interlinking gears and extend from the rear housing into the gear casing.

15. The electric work vehicle according to claim 1, wherein the first motor is located on a left side of the rear housing; the second motor is located on a right side of the rear housing; the third motor is located on a front side of the rear housing; and the fourth motor is located on the left side of the rear housing.

16. The electric work vehicle according to claim 15, wherein the first electric work vehicle component other than a wheel includes a Power-Take Off (PTO); and the third motor is connected to the PTO via a PTO shaft which extends from the front side of the rear housing out through an opening in a rear side of the rear housing.

17. The electric work vehicle according to claim 16, wherein the PTO shaft is connected to the third motor through at least one PTO gear; and the PTO shaft is located below an output shaft of the PTO in the up-down direction of the electric work vehicle.

18. An electric work vehicle comprising: a rear housing; a first motor to drive a first rear wheel, the first motor being supported by the rear housing; a second motor to drive a second rear wheel, the second motor being supported by the rear housing; and a locking assembly; wherein the first motor is connected to a first gearing to drive the first rear wheel; the second motor is connected to a second gearing to drive the second rear wheel; the first gearing and the second gearing are operable to rotate independently of each other; the locking assembly is operable to simultaneously lock both of the first gearing and the second gearing from being able to rotate; the first gearing includes a plurality of gears that define a first high gear transmission path and a plurality of gears that define a first low gear transmission path; the second gearing includes a plurality of gears that define a second high gear transmission path and a plurality of gears that define a second low gear transmission path; and the locking assembly is operable to engage with the first low gear transmission path and the second low gear transmission path to simultaneously lock both of the first gearing and the second gearing.

19. An electric work vehicle comprising: a rear housing; a first motor to drive a first rear wheel, the first motor being supported by the rear housing; a second motor to drive a second rear wheel, the second motor being supported by the rear housing; and a locking assembly; wherein the first motor is connected to a first gearing to drive the first rear wheel;

the second motor is connected to a second gearing to drive the second rear wheel;

the first gearing and the second gearing are operable to rotate independently of each other; and the locking assembly is operable to simultaneously lock both of the first gearing and the second gearing from being able to rotate;

the locking assembly includes a shaft;

a first actuator is connected to a first end of the shaft, the first actuator being structured to receive a manual operation from a user;

a second actuator is connected to a second end of the shaft, the second actuator being controlled by a controller; and the operation of the second actuator can be performed without affecting a positioning of the first actuator.

\* \* \* \* \*